(12) United States Patent
Barbieri

(10) Patent No.: US 12,081,828 B2
(45) Date of Patent: Sep. 3, 2024

(54) SYSTEMS AND METHODS FOR PLAYING MEDIA ASSETS STORED ON A DIGITAL VIDEO RECORDER IN PERFORMING CUSTOMER SERVICE OR MESSAGING

(71) Applicant: DISH Network L.L.C., Englewood, CO (US)

(72) Inventor: John D. Barbieri, Littleton, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/890,783

(22) Filed: Jun. 2, 2020

(65) Prior Publication Data

US 2021/0377595 A1     Dec. 2, 2021

(51) Int. Cl.
| | |
|---|---|
| *H04N 21/434* | (2011.01) |
| *H04N 21/234* | (2011.01) |
| *H04N 21/2362* | (2011.01) |
| *H04N 21/262* | (2011.01) |
| *H04N 21/433* | (2011.01) |
| *H04N 21/4784* | (2011.01) |

(52) U.S. Cl.
CPC ... *H04N 21/4345* (2013.01); *H04N 21/23424* (2013.01); *H04N 21/2362* (2013.01); *H04N 21/26241* (2013.01); *H04N 21/4331* (2013.01); *H04N 21/4784* (2013.01)

(58) Field of Classification Search
CPC ..................................................... H04N 21/40
See application file for complete search history.

(56) References Cited

U.S. PATENT DOCUMENTS

| | | | |
|---|---|---|---|
| 5,983,369 | A | 11/1999 | Bakoglu et al. |
| 5,987,213 | A | 11/1999 | Mankovitz et al. |
| 6,084,628 | A | 7/2000 | Sawyer |
| 6,177,931 | B1 | 1/2001 | Alexander et al. |
| 6,999,990 | B1 | 2/2006 | Sullivan et al. |

(Continued)

OTHER PUBLICATIONS

U.S. Appl. No. 16/898,128, filed Jun. 10, 2020, Systems and Methods For Playing Media Assets Stores on a Digital Video Recorder.

(Continued)

*Primary Examiner* — Mushfikh I Alam
(74) *Attorney, Agent, or Firm* — Frontier IP Law PLLC; Kipman Tyler Werking

(57) ABSTRACT

Improved technical functionality is provided to dynamically select and seamlessly play advertisements immediately before playing of a recorded program upon selection of the recorded program for playing, or upon other detected events and conditions associated with the set-top-box (STB) or user. In some embodiments, this is performed by using metadata which may be delivered to and stored on a digital video recorder (DVR) prior to recording the program, providing a technical solution to enable opportunities for additional advertisement impressions. Playing of the advertisement may also or instead occur upon the recorded program finishing playing. Thus, the technical solution provides the additional opportunity for the content creator and/or the satellite television or cable service provider to sell advertising spots in addition to those already sold for breaks within the recorded program.

13 Claims, 22 Drawing Sheets

(56) References Cited

U.S. PATENT DOCUMENTS

| | | | |
|---|---|---|---|
| 7,281,034 B1* | 10/2007 | Eyal | H04N 21/26258 709/206 |
| 7,899,305 B2 | 3/2011 | White | |
| 8,117,564 B2 | 2/2012 | Woods et al. | |
| 8,281,339 B1 | 10/2012 | Walker et al. | |
| 9,269,088 B2* | 2/2016 | Davis | G06Q 30/0277 |
| 10,149,008 B1* | 12/2018 | Logan | H04N 21/8405 |
| 10,250,917 B1* | 4/2019 | Nijim | H04N 21/25866 |
| 10,693,856 B2 | 6/2020 | Cox, Jr. et al. | |
| 10,986,414 B1 | 4/2021 | Qureshi et al. | |
| 11,838,596 B2 | 12/2023 | Ramkumar | |
| 2001/0009548 A1 | 7/2001 | Morris | |
| 2001/0049820 A1 | 12/2001 | Barton | |
| 2002/0007492 A1* | 1/2002 | Smyth | H04N 21/44209 348/192 |
| 2002/0042914 A1 | 4/2002 | Walker et al. | |
| 2002/0057893 A1 | 5/2002 | Wood et al. | |
| 2002/0066106 A1 | 5/2002 | Kanojia et al. | |
| 2002/0078444 A1 | 6/2002 | Krewin et al. | |
| 2002/0083439 A1 | 6/2002 | Eldering | |
| 2002/0087975 A1 | 7/2002 | Schlack | |
| 2002/0100062 A1 | 7/2002 | Lowthert et al. | |
| 2002/0124249 A1 | 9/2002 | Shintani et al. | |
| 2002/0161739 A1 | 10/2002 | Oh | |
| 2002/0174430 A1 | 11/2002 | Ellis et al. | |
| 2002/0184639 A1 | 12/2002 | Frost | |
| 2003/0110499 A1 | 6/2003 | Knudson et al. | |
| 2003/0154128 A1 | 8/2003 | Liga et al. | |
| 2003/0208760 A1 | 11/2003 | Sugai et al. | |
| 2004/0133910 A1 | 7/2004 | Gordon et al. | |
| 2004/0158858 A1 | 8/2004 | Paxton et al. | |
| 2005/0060229 A1 | 3/2005 | Riedl et al. | |
| 2005/0114204 A1 | 5/2005 | Kim et al. | |
| 2005/0235319 A1 | 10/2005 | Carpenter et al. | |
| 2006/0031262 A1 | 2/2006 | Satoh et al. | |
| 2006/0156352 A1 | 7/2006 | Smith et al. | |
| 2007/0077028 A1 | 4/2007 | Bodkin et al. | |
| 2007/0162928 A1* | 7/2007 | Mickle | H04N 21/6543 348/E7.071 |
| 2007/0162930 A1* | 7/2007 | Mickle | H04L 41/5054 348/E7.071 |
| 2007/0204310 A1 | 8/2007 | Hua et al. | |
| 2008/0127246 A1 | 5/2008 | Sylvain | |
| 2008/0139193 A1 | 6/2008 | Hao et al. | |
| 2009/0031335 A1* | 1/2009 | Hendricks | H04N 21/63345 725/1 |
| 2009/0106104 A1 | 4/2009 | Upendran et al. | |
| 2009/0122879 A1* | 5/2009 | Howe | H04N 19/159 375/E7.279 |
| 2009/0138907 A1 | 5/2009 | Wiser et al. | |
| 2009/0158341 A1 | 6/2009 | Miller | |
| 2009/0187939 A1 | 7/2009 | Lajoie | |
| 2009/0210899 A1 | 8/2009 | Lawrence-Apfelbaum et al. | |
| 2009/0307612 A1 | 12/2009 | Singh et al. | |
| 2010/0153885 A1 | 6/2010 | Yates | |
| 2010/0161429 A1 | 6/2010 | Mandel | |
| 2010/0218030 A1 | 8/2010 | Bhatnagar et al. | |
| 2010/0238924 A1 | 9/2010 | Liu | |
| 2010/0325657 A1 | 12/2010 | Sellers et al. | |
| 2011/0110515 A1 | 5/2011 | Tidwell et al. | |
| 2011/0194838 A1 | 8/2011 | Meijer | |
| 2011/0238507 A1 | 9/2011 | Ben-Rubi | |
| 2011/0249081 A1 | 10/2011 | Kay et al. | |
| 2011/0252445 A1 | 10/2011 | Ko et al. | |
| 2012/0054785 A1* | 3/2012 | Yang | H04N 21/6582 725/16 |
| 2012/0072282 A1 | 3/2012 | Leigh et al. | |
| 2012/0096489 A1 | 4/2012 | Shkedi | |
| 2012/0110620 A1 | 5/2012 | Kilar et al. | |
| 2012/0114302 A1 | 5/2012 | Randall | |
| 2012/0130971 A1* | 5/2012 | Morris | G06F 16/335 707/765 |
| 2012/0172033 A1* | 7/2012 | Hilton | H04W 4/021 455/423 |
| 2012/0209961 A1* | 8/2012 | McCoy | H04N 21/4436 709/219 |
| 2012/0216224 A1 | 8/2012 | Rajagopal et al. | |
| 2013/0007799 A1 | 1/2013 | Sandoval | |
| 2013/0014171 A1 | 1/2013 | Sansom et al. | |
| 2013/0014190 A1 | 1/2013 | Sansom et al. | |
| 2013/0051764 A1 | 2/2013 | Casagrande | |
| 2013/0055309 A1 | 2/2013 | Dittus | |
| 2013/0081078 A1 | 3/2013 | Del et al. | |
| 2013/0179917 A1 | 7/2013 | Gu et al. | |
| 2013/0227013 A1* | 8/2013 | Maskatia | H04N 21/4104 709/204 |
| 2014/0024348 A1 | 1/2014 | Hurst et al. | |
| 2014/0074855 A1* | 3/2014 | Zhao | H04N 21/8456 707/746 |
| 2014/0130111 A1 | 5/2014 | Nulty et al. | |
| 2014/0259057 A1 | 9/2014 | Lv et al. | |
| 2014/0298381 A1 | 10/2014 | Koyama et al. | |
| 2014/0325558 A1 | 10/2014 | Fitzgerald | |
| 2014/0329565 A1 | 11/2014 | Mannix et al. | |
| 2015/0007220 A1* | 1/2015 | Nakano | H04N 21/6332 725/110 |
| 2015/0033127 A1 | 1/2015 | Abbas et al. | |
| 2015/0040172 A1* | 2/2015 | Zelesko | H04N 21/44227 725/110 |
| 2015/0256581 A1* | 9/2015 | Kolhi | H04N 21/4126 709/219 |
| 2015/0324832 A1 | 11/2015 | Kaufman | |
| 2016/0037232 A1 | 2/2016 | Hu et al. | |
| 2016/0094600 A1 | 3/2016 | Besehanic | |
| 2016/0105715 A1* | 4/2016 | Panje | H04N 21/4424 725/14 |
| 2016/0127788 A1 | 5/2016 | Roberts et al. | |
| 2016/0219142 A1 | 7/2016 | Brown | |
| 2016/0294897 A1* | 10/2016 | Bryant | H04L 65/4069 |
| 2017/0064398 A1* | 3/2017 | Ventrapragada | H04N 21/47202 |
| 2017/0118513 A1 | 4/2017 | Pati et al. | |
| 2017/0180448 A1* | 6/2017 | Lewis | H04L 43/08 |
| 2017/0185596 A1 | 6/2017 | Spirer | |
| 2017/0188116 A1 | 6/2017 | Major et al. | |
| 2017/0286969 A1 | 10/2017 | Ilagan | |
| 2017/0302916 A1* | 10/2017 | Tiwari | H04N 21/2221 |
| 2018/0103080 A1* | 4/2018 | Girish | H04W 76/20 |
| 2018/0167684 A1* | 6/2018 | Cox | H04N 21/8133 |
| 2018/0199110 A1 | 7/2018 | Cormican et al. | |
| 2018/0262809 A1* | 9/2018 | Li | H04N 21/4622 |
| 2019/0082226 A1* | 3/2019 | Ramamurthy | H04N 21/4394 |
| 2019/0320233 A1* | 10/2019 | Zhao | H04N 21/4181 |
| 2019/0332162 A1* | 10/2019 | Sprenger | H04N 5/268 |
| 2019/0340658 A1 | 11/2019 | Udupa et al. | |
| 2020/0036942 A1 | 1/2020 | Pranger et al. | |
| 2021/0294558 A1* | 9/2021 | Griffin | H04L 69/28 |

OTHER PUBLICATIONS

U.S. Appl. No. 16/910,671, filed Jun. 24, 2020, Systems and Methods For Using Metadata to Play Media Assets Stored on a Digital Video Recorder.

U.S. Appl. No. 16/886,412, filed May 28, 2020, Systems and Methods For Selecting and Restricting Playing of Media Assets Stored on a Digital Video Recorder.

U.S. Appl. No. 16/897,053, filed Jun. 9, 2020, Systems and Methods For Playing Media Assets Stored on a Digital Video Recorder Based on a Determined Beginning of a Recorded Program.

U.S. Appl. No. 16/886,436, filed May 28, 2020, Systems and Methods For Overlaying Media Assets Stored on a Digital Video Recorder on a Menu or Guide.

U.S. Appl. No. 16/886,455, filed May 28, 2020, Systems and Methods to Generate Guaranteed Advertisement Impressions.

U.S. Appl. No. 16/898,136, filed Jun. 10, 2020, Systems and Methods For Plating Media Assets Stored on a Digital Video Recorder While a Customer Service Representative is Online.

Minnick, Danny J., et al., "Systems and Methods for Playing Media Assets Stored on a Digital Video Recorder," U.S. Appl. No. 16/898,128, filed Jun. 10, 2020, 93 pages.

(56) References Cited

OTHER PUBLICATIONS

Percival, Robert F., et al., "Systems and Methods for Using Metadata To Play Media Assets Stored on a Digital Video Recorder," U.S. Appl. No. 16/910,671, filed Jun. 24, 2020, 94 pages.

Yang, Yunfeng et al., "Systems and Methods for Selecting and Restricting Playing of Media Assets Stored on a Digital Video Recorder," U.S. Appl. No. 16/886,412, filed May 28, 2020, 94 pages.

Yang, Yunfeng, "Systems and Methods for Playing Media Assets Stored on a Digital Video Recorder Based on a Determined Beginning of a Recorded Program," U.S. Appl. No. 16/897,053, filed Jun. 9, 2020, 94 pages.

Ramkumar, Gowtham Ram, "Systems and Methods for Overlaying Media Assets Stored on a Digital Video Recorder on a Menu or Guide," U.S. Appl. No. 16/886,436, filed May 28, 2020, 92 pages.

Minnick, Danny J., "Systems and Methods to Generate Guaranteed Advertisement Impressions," U.S. Appl. No. 16/886,455, filed May 28, 2020, 39 pages.

Barbieri, John D., et al., "Systems and Methods for Playing Media Assets Stored on a Digital Video Recorder While a Customer Service Representative is Online," U.S. Appl. No. 16/898,136, filed Jun. 10, 2020, 93 pages.

\* cited by examiner

SYSTEMS AND METHODS FOR PLAYING MEDIA ASSETS STORED ON A DIGITAL VIDEO RECORDER IN PERFORMING CUSTOMER SERVICE OR MESSAGING

TECHNICAL FIELD

The present disclosure relates playing of media assets, and in particular to systems and methods for playing media assets stored on a digital video recorder.

BRIEF SUMMARY

Multichannel media distribution (MMD) platforms, such as those of satellite television and cable serve providers, provide desired multimedia programming to hundreds of thousands, or even millions, of set-top boxes ("STBs" or "STB devices") located respectively at locations of various media content users. Many STBs are also digital video recorders (DVRs) which have the ability to record content, including television programs and other content broadcast to such STBs. With addressable advertising insertion, the program content stream recorded by the DVRs may include cues for the DVR to dynamically insert advertisements during playback of such recorded content. However, the embodiments described herein also provide the functionality to dynamically select and seamlessly play advertisements immediately before playing of the recorded program upon selection of the recorded program for playing. In some embodiments, this is performed by using media asset metadata which may be delivered to and stored on the DVR prior to recording the program. This provides a technical solution to enable opportunities for additional advertisement impressions. The playing of the advertisement may also or instead occur upon the recorded program finishing playing. Thus, the technical solutions described herein provide the additional opportunity for the content creator and/or the satellite television or cable service provider to sell advertising spots in addition to those already sold for breaks within the recorded program.

In one example, the media asset metadata may include a service identifier (Service ID) that identifies a service of the DVR that plays recorded programs or a particular category of recorded programs. This Service ID may be used by the DVR to identify a particular advertisement (or type of advertisement) to play. The metadata may also include multiple Service IDs, each of which identifies a different service of the DVR, such as individual Service IDs for providing particular menus or guides, help menus, DVR events, customer service calls or chat sessions, detection of events or customer status, detection of customer information, playing of particular categories or types of programs or data, etc. This enables the DVR to select and play particular messages or advertisements targeted based on the Service ID of, or associated with, the service invoked or initiated by the DVR. In an example embodiment, the plurality of Service IDs recognized by the DVR also includes one or more other Service IDs that each identifies a different television broadcast channel received by the DVR as an addressable service. Thus, in some embodiments, such metadata may have a structure that is readily recognized by the DVR and associated systems of the satellite or cable television service provider, which may also use such Service IDs of television channels for dynamic ad insertion into those television channels.

DETAILED DESCRIPTION

In the following description, certain specific details are set forth in order to provide a thorough understanding of various disclosed embodiments. However, embodiments may be practiced without one or more of these specific details, or with other methods, components, materials, etc. Well-known structures and methods associated with media content delivery have not been shown or described in detail to avoid unnecessarily obscuring descriptions of the preferred embodiments.

Unless the context requires otherwise, throughout the specification and claims which follow, the word "comprise" and variations thereof, such as, "comprises" and "comprising" are to be construed in an open, inclusive sense, for example, "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
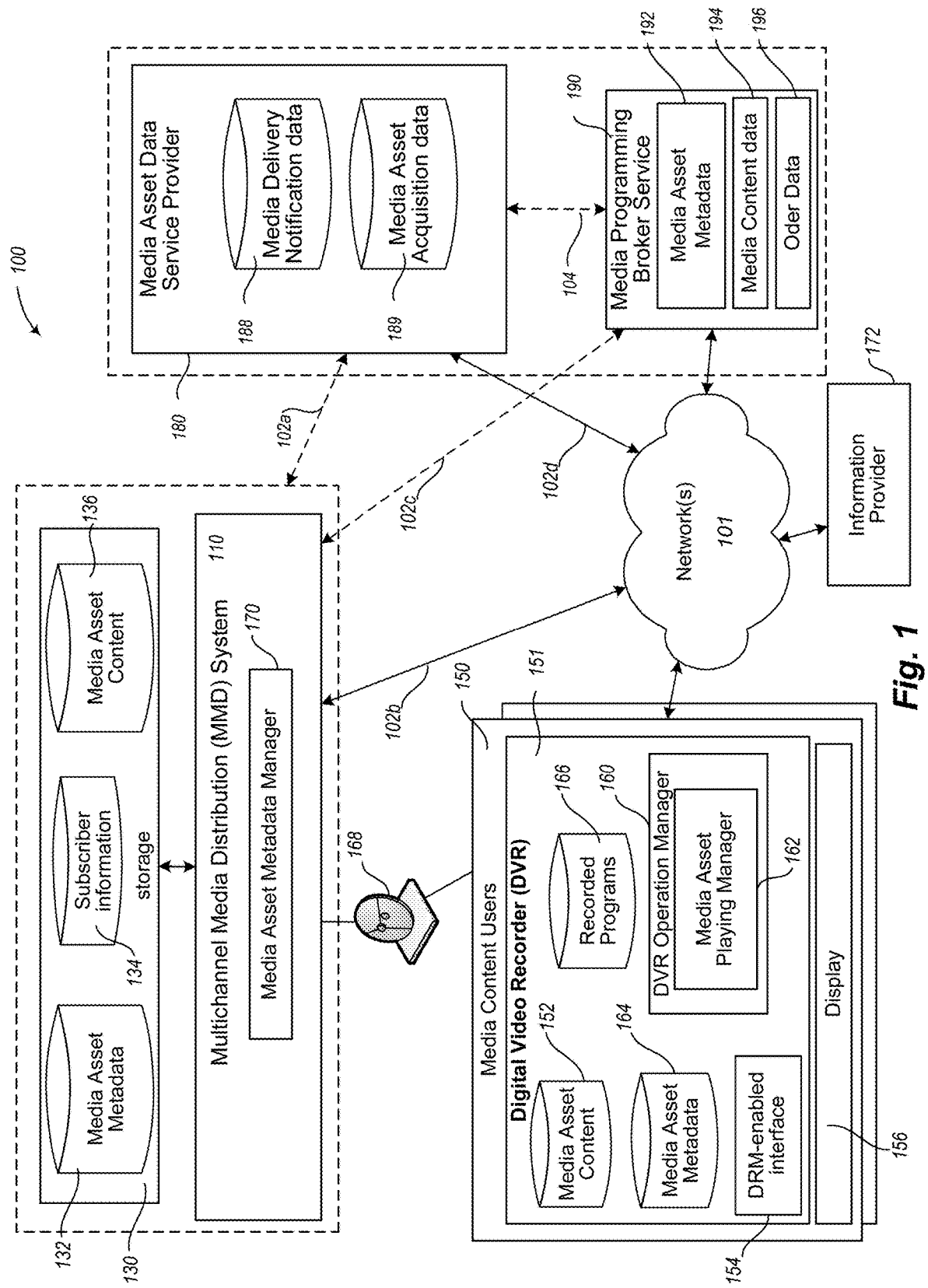
FIG. 1 is an overview block diagram illustrating an example networked environment in which systems and methods for playing media assets stored on a digital video recorder (DVR) may be implemented, according to various embodiments described herein.

FIG. 1 is an overview block diagram illustrating an example networked environment 100 in which systems and methods for playing media assets stored on a digital video recorder (DVR) may be implemented, according to various embodiments described herein.

Multichannel media distribution platforms, such as satellite television service providers and cable television service providers, interact with large numbers of hardware devices associated with their respective consumer subscribers. As one example, a multichannel media distribution (MMD) platform, such as MMD system 110, may provide desired multimedia programming to hundreds of thousands, or even millions, of set-top boxes ("STBs" or "STB devices"), including, for example, DVR 151, and respectively located locations of the various media content users 150, in order to facilitate those STBs receiving, storing, scheduling, and displaying that multimedia programming. A main television receiver, such as an STB provided by a cable or satellite television service provider (e.g., DVR 151), is connected to a cable or satellite television service provider system (e.g., MMD system 110) and serves as the interface between the backend cable or satellite television service provider system and the home entertainment system on the customer premises of the media content user 150. Such multimedia programming may include entertainment or other programs requested or otherwise selected by a consumer subscriber, as well as a variety of media assets, such as, for example, advertisements or other promotional media. Such media assets for linear television (TV) broadcasts, addressable TV and/or addressable over-the-top (OTT) and Internet-connected TV may be delivered to the STB separately from other programming, such as televisions shows and movies, and stored on the STB for later insertion.

With linear TV advertisement (ad) buys (against scheduled satellite and cable broadcast TV programming), one ad is delivered to many consumers, either nationally or locally, through broadcast affiliates or satellite. Ads may be bought in advance on a contextual basis against broad demographic targets set based on television ratings, such as women ages 25-34, for example. With addressable linear TV technology, specific media content users 150, including specific households, may be targeted using data provided by addressable broadcaster STBs, such as DVR 151, and other data providers, such as media programming broker service (MPBS) 190 and/or media asset data service provider (MADSP) 180. Via dynamic addressable ad insertion, the technology deployed on the STBs, such as DVR 151, enables different STBs (and thus different homes) to see different ads, even when watching the same program. An STB, such as DVR 151, that connects to the Internet (natively or via an over-the-top (OTT) streaming device like Apple TV®, Google Chromecast®, Roku®, Amazon Firestick® or a game console), has the functionality for real-time ad buy decisioning on what media assets to serve and display to the consumer via the DVR 151.

For example, in various scenarios, such media assets or other media programming provided via these large numbers of STBs may be presented according to orders received in conjunction with one or more media programming broker services, such as MPBS 190, and/or provided in conjunction with one or more media asset data service providers, such as MADSP 180. The provision of media assets may include coordinated delivery of digital files from the MMD system 110, the MPBS 190 and/or the MADSP 180 that include multiple days' worth of scheduled presentations of media assets delivered ahead of time ("spooled") to each of hundreds of thousands, or even millions, of STB devices, such as DVR 151, for example. Various entities have an interest in playing and/or tracking playing of such media assets, not only during regularly scheduled broadcast programs and on-demand or streaming OTT programming, but also upon playback on the DVR 151 of recorded programs 166 and other conditions or events associated with the user and/or STB, such as DVR 151. For example, such entities may include those operating the MMD system 110 associated with the STB devices, those operating the MPBS 190, advertisers who may pay for individual instances ("impressions") of the scheduled media presentations, and those operating the MADSP 180. Such entities also have an interest in determining the individual and/or aggregated status of the playing of such media assets such that impressions may be tracked accordingly.

The MPBS 190 may provide media asset metadata 192, which may include media timestamp or timeslot data, service identifiers and/or other scheduling information regarding the future display of multiple media assets, to an MMD platform (e.g., a satellite television service provider or cable television service provider) such as MMD system 110 associated with a large plurality of media content users 150 (interchangeably termed "subscribers" herein). Each of those media content users may have one or more STB devices, such as DVR 151, located at a customer premises location. For example, such media asset metadata 192 may include a service identifier (Service ID) identifying a particular cable or satellite television channel on which a media asset is to be presented and data indicating at what time, at which break, at which spot or avail, and/or or during which television program the media asset is to be presented. Such data may also include indications or conditions for selecting a particular media asset or type of media asset from a plurality of media assets stored on the STB, such as DVR 151. The media asset will then be selected and presented by the STB, such as DVR 151, by inserting the media asset into the linear, on-demand or OTT program content stream at the corresponding time before it is presented on display 156, according to such previously received information and/or according to breaks and a cue received within the television broadcast or streaming signal. Such information indicative of when the media asset is to be presented and/or used to dynamically select the media asset for presentation is generally referred to herein as media asset metadata.

In one embodiment, the media asset playing manager 162 of the DVR operation manager 160 may cause automatic playing of selected media assets stored on the DVR 151 to occur upon selection for playing of a recorded program on the DVR 151 from the beginning of the program, such that the media asset is played immediately before playback of the recorded program starts. In some embodiments, automatic playing of media assets stored on the DVR 151 may also or instead occur upon the recorded program finishing playing. Such automatic playing of selected media assets stored on the DVR 151 to occur upon selection for playing of a recorded program on the DVR 151 or upon the recorded program finishing playing may be based on media asset metadata 132 previously received from the MMD system 110 and stored on the DVR 151 as media asset metadata 164. This provides the additional opportunity for the MMD system 110, a content creator and/or the MPBS 190 to sell advertising spots in addition to those already sold for breaks within the recorded program. To increase efficiency and reduce complexity, such media asset metadata 164 may have a structure that is readily recognized by the DVR 151 and associated systems associated the cable or satellite television service provider, such as MPBS 190, and MADSP 180, MMD system 110, which may also use such Service IDs of television channels for dynamic ad insertion into those television channels. For example, the Society of Cable Telecommunications Engineers (SCTE) develops technology standards related to cable telecommunications engineering. The SCTE 35 standard defines the splicing of an MPEG-4 transport stream for the purpose of digital program insertion. The SCTE 35 standard also defines messages and structure that allow the program distributor to splice, or insert, advertisements and other digital program content into the audio/video content. The media asset metadata may also or instead follow a media asset metadata structure compatible with that already used by the MPBS 190 and/or the MADSP 180 for dynamic ad insertion.

The content of media asset metadata 164 used in various embodiments described herein may follow, include or use some of all of the media asset metadata structure that is already used by the MMD system 110, the MADSP 180, the MPBS 190 and/or the DVR 151 for dynamic ad insertion may then be modified by the MMD system 110, the MADSP 180, the MPBS 190 and/or the DVR 151 and stored on the DVR 151 such that a particular stored media asset is selected and played from the DVR 151 upon selection for playing of a recorded program instead of when a particular spot is reached or break and cue are read in the linear, on-demand or OTT program content stream. For example, in some embodiments, such media asset metadata 164 causing the DVR 151 to select and play one or more media assets from the DVR 151 upon selection for playing of a recorded program may be previously received from the MMD system 110, MPBS 190 and/or MADSP 180 via the Internet over network(s) 101.

Based on the provided media asset metadata 132 generated and/or accessible by the MMD system 110, the MMD system 110 provides ("spools") one or more media asset files from media asset content 136 containing the multiple media assets to some or all of those STB devices, such as DVR 151, in advance of the future display, such as via satellite television connection 168, and/or one or more wired or wireless network connections via network(s) 101. Such media asset content may be stored by the DVR 151 in media asset content storage 152. For example, the MMD system 110 may at various times spool up to four days' media assets (including but not necessarily limited to advertisement media assets) to a subset of STB devices (such as STB devices associated with some or all customers located in a particular geographical region) in advance of the display of those media assets. In this manner, a particular STB device, such as DVR 151, may store all such media assets estimated to be presented within the next four days. In various embodiments, downloading of media asset metadata and/or spooling of the media assets may occur at regular intervals (such as daily or semi-daily), in response to one or more events (such as responsive to receiving scheduling information or other metadata regarding one or more new media assets, to receiving an indication that the STB device is in a low-activity state, or other event) or other time.

Following the scheduled time for the presentation or an actual presentation of one or more media assets, each of the plurality of STB devices, such as DVR 151, may provide a status report regarding each of one or more scheduled presentations or actual presentation of each media asset, including the playing of media assets upon selection of a recorded program and/or upon the recorded program finishing playing. In various embodiments and scenarios, such status reports may be provided at regular intervals (such as daily or semi-daily), in response to one or more events (such as responsive to an indication that the STB device is in a low-activity state, or other event) or other time. For example, DVR 151 may provide a report, via impression report generation manager 244 of FIG. 2, associated with multiple past scheduled or actual presentations of a media asset to track impressions for substantive analysis and accountability, to derive qualitative information, and for calculation of various performance metrics.

Status reports provided from one or more STB devices may be sent in various scenarios directly to the MMD system 110, and/or to one or more media asset data service providers, such as MADSP 180. In an exemplary embodiment, such status reports are provided to MADSP 180, which aggregates, compresses, encrypts, and transmits one or more resulting media delivery notification (MDN) data files to the MMD system 110. In one or more embodiments, the MADSP 180 transmits (such as over network(s) 101 via one or more computer networks or other transmission medium) one or more MDN data files to the MMD system 110 for analysis.

By performing these or other operations in accordance with techniques described herein, the systems and methods for playing media assets stored on a DVR described herein enables relevant media assets such as advertisements or other messages to be automatically played when they previously could not have been so seamlessly and easily played, such as upon selection of a recorded program for playing from the DVR, immediately when a recorded program finishes playing, and/or other event or condition (selectable by a multichannel media distribution system) associated with the particular STB or user.

Also, the systems and methods for playing media assets stored on a DVR described herein, with the efficient techniques described herein for media asset metadata and other techniques described herein, improves the functioning of computer or other hardware, such as by reducing the processing, storage, and/or data transmission resources needed to perform various tasks, thereby enabling the tasks to be performed by less capable, capacious, and/or expensive hardware devices, and/or be performed with less latency, and/or preserving more of the conserved resources for use in performing other tasks or additional instances of the same task. The systems and methods for playing media assets stored on a DVR described herein also prevent the expenditure of human and computing resources that would otherwise be utilized to overcome the limitations of tracking media asset presentations using other techniques that are not compatible and do not integrate well with existing media programming broker services and media asset data provider systems.

The example networked environment 100 includes a MMD system 110, a MADSP 180, a media programming broker service 190, and a plurality of media content users 150 that are each associated with at least one DVR 151. For purposes of clarity, the example networked environment 100 includes a single MADSP 180 and a single MPBS 190; it will be appreciated that in various scenarios and embodiments, multiple such entities may be communicatively connected with, and provide one or more services to, the exemplary MMD system 110.

In operation, the MMD system 110 may provide media programming (such as advertisements or other messages) to the plurality of media content users 150 via one or more media asset data files in accordance with data indicative of which media assets are to be presented to which media content users including, but not limited to: media asset metadata generated by the MMD system, MPBS 190 and/or MADSP 180, presentation schedules or other information provided by the MPBS 190, data indicative orders of ad buys, etc. In the depicted networked environment 100, the MMD system provides the media content users 150 with a multitude of video and/or data programming (herein, collectively "programming") via the associated DVR 151 and/or other STB device. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

During operation, the media programming broker service 190 maintains media asset metadata 192 (which may include media timeslot data) and media content data 194, and based on that maintained data provides scheduling information for future interstitial media asset presentations to the MMD system, such as to provide indications of indicated timeslots for interstitial advertisements that have been purchased by advertisers or their representatives for display during "breaks" in other scheduled programming. Prior to the playback of recorded programs, the media asset metadata manager 170 of the MMD system 110 may also generate, maintain and send media asset metadata 132 indicative of when a media asset, or type of media asset, is to be played by the DVR 151 upon selection of a recorded program from the DVR 151 for playback and/or upon finishing of playing a recorded program. Such media asset metadata 132 may also be used by the DVR 151 to dynamically select the media asset for presentation upon selection of a recorded program from the DVR 151 for playback and/or upon finishing of playing a recorded program. The media asset metadata manager 170 of the MMD system 110 may communicate, such as over network(s) 101, different media asset metadata 132 to each corresponding DVR, including DVR 151. The media asset metadata 132 may be individualized for the particular DVR 151 and/or particular media content user associated with the DVR 151 according to media assets, or types of media assets, to be played on the particular DVR 151 and/or subscriber information 134 associated with the DVR, which may be based on ad buy order data 196 received from the MPBS 190 and/or MADSP 180. In some embodiments, the media asset metadata 132 and the media asset metadata 192 may be communicated to the DVR 151 and stored on the DVR 151 in the media asset metadata storage 164.

Based at least in part on the media asset metadata 132 and media asset metadata 192, the MMD system 110 spools sets (or "packages") of multiple corresponding media assets to multiple DVR devices 151. In this manner, the MMD system 110 may store all media assets estimated to be presented during a preselected time period (e.g., for multiple upcoming days at a time) as at least part of the media assets data stored by DVR devices 151 on media asset content storage 152. During a preselected time period, and in accordance with media asset metadata 192 provided to each DVR device 151 by the MMD system 110 via media asset metadata manager 170 and stored in media asset metadata storage 164, each DVR device 151 initiates the insertion of an indicated media asset into each of one or more such breaks occurring during programming being presented to one or more associated media content users 150 via a corresponding display device 156. Also, at least some of the previously received media asset metadata 132 stored as media asset metadata 164 causes the DVR 151 to select and play one or more media assets from the media asset content storage 152 of DVR 151 upon selection of a recorded program from the recorded programs 166 in the DVR 151 for playback and/or upon finishing of playing a recorded program. Such media asset metadata 164 may also be used by the DVR 151 to dynamically select the media asset for presentation upon selection of a recorded program from the DVR 151 for playback and/or upon finishing of playing a recorded program. For example, this may be based on at least some of the asset metadata 164 being associated with one or more of: the DVR, the media asset, the recorded program and one or more services of the DVR associated with playing or finishing of playing of the recorded program.

In at least the depicted embodiment, each DVR device 151 additionally generates a status report message regarding each attempt to play a media asset. The generated status report messages may be provided to MADSP 180, which aggregates and packages the status report messages from one or more pluralities of DVR devices 151. The resulting MDN data files may be stored or otherwise maintained by the MADSP 180 via MDN database 188 and/or media asset acquisition database 189. In some embodiments, the MADSP 180 may use status report messages from one or more DVR devices, such as DVR 151, to track impressions for substantive analysis and accountability, to derive qualitative information, and an/or for calculation of various performance metrics, and may incorporate such information into the MDN files. The MADSP 180 may then provide the packaged MDN data files to the MMD system 110, such as via network(s) 101 and/or a dedicated data connection 102a and/or to the MPBS 190 via connection 104. The MMD system 110 and/or the MPBS 190 may also use the report messages from one or more pluralities of DVR devices 151 and/or MDN data files to track impressions for substantive analysis and accountability, to derive qualitative information, and an/or for calculation of various performance metrics.

In the depicted exemplary networked environment 100, the MADSP 180, MPBS 190, and DVR devices 151 are each communicatively coupled to the MMD system 110 via one or more intervening networks 101, which may comprise one or more computer networks, one or more wired or wireless networks, satellite transmission media, one or more cellular networks, the Internet or some combination thereof. The network(s) 101 may include a publicly accessible network of linked networks, possibly operated by various distinct parties, such as the Internet. The network 101 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the network 101 may include various types of wired and/or wireless networks in various situations, including satellite transmission. In addition, users within the exemplary networked environment 100 may utilize additional client computing systems and/or other client devices (not shown) to interact with the MMD system 110 to obtain various described functionality via the network(s) 101, and in doing so may provide various types of information to the MMD system 110. In certain implementations, the various users and providers of the networked environment 100 may interact with the MMD system and/or one or more other users and providers using an optional private or dedicated connection, such as one of dedicated connections 102a, 102b, 102c and 102d.

In the depicted embodiment, the MMD system 110 includes a media asset metadata manager 170 that manages the communication of media asset metadata 132 to the DVR 151 to be stored as media asset metadata 164 on the DVR 151. In some embodiments, the MMD system 110, the MADSP 180, and/or MPBS 190 receives an indication of an order for a media asset to be played immediately before a selected recorded program is played. For example, the order may be for insertion of the media asset to occur at a plurality of DVRs (e.g., identified by some common demographic or other characteristic of users associated with the DVRs), including DVR 151, upon selection of a recorded program stored on any of such DVRs for playing from a beginning of the recorded program. The MMD system 110, the MADSP 180, and/or MPBS 190 then generates media asset metadata (e.g., media asset metadata 132 and/or media asset metadata 192) to be sent to such DVRs, including DVR 151, that causes each DVR to select and play the corresponding media asset stored on the DVR based on the metadata upon selection of a recorded program stored on the DVR. The MMD system 110, the MADSP 180, and/or MPBS 190 then sends the media asset metadata to the DVRs, including DVR 151, such that when recorded programs are selected to be played on those DVRs, the media assets stored on the DVRs are played according to the order. In embodiments in which the MMD system 110 sends the media asset metadata to the DVRs, the media asset metadata manager 170 sends this media asset metadata to the DVRs.

In some embodiments, the media asset metadata manager 170 receives a request from DVRS, such as DVR 151 for updated metadata. In response to receiving the request, the media asset metadata manager 170 may determine that the media asset metadata 132 has not yet been sent to DVR 151. The sending of the media asset metadata 132 to the DVR 151 is thus in response to the determination that the metadata has not yet been sent to the DVR 151.

In other embodiments, the media asset metadata manager 170 periodically determines whether a plurality of DVRs has been sent recently generated media asset metadata 132 generated in response to receiving an indication of a plurality of orders for insertion of respective media assets. For example, the plurality of orders may be for insertion to occur at the plurality of DVRs upon selection, at each DVR of the plurality of DVRs, of a recorded program stored on the DVR for playing from a beginning of the recorded program. In response to the periodic determination, the media asset metadata manager 170 may determine that the recently generated media asset metadata 132 has not yet been sent to one or more DVRs of the plurality of DVRs, including DVR 151. The media asset metadata manager 170 may then send the recently generated media asset metadata 132 to such DVRs, including DVR 151, in response to the determination.

As one example, the media asset metadata 132 may be generated by the MMD system 110 in response to receiving an indication of a plurality of orders (e.g., from MPBS 190) for insertion of respective media assets to occur at the plurality of DVRs upon selection, at each DVR of the plurality of DVRs, of a recorded program stored on the DVR for playing from a beginning of the recorded program. In some embodiments, this generated media asset metadata 132 to be sent to the DVR 151 may cause DVR 151 to select and play a media asset stored on DVR 151 based on the media asset metadata 132 upon selection of a recorded program stored on DVR 151. In response to the periodic determination, the MMD system 110 may determine that the recently generated media asset metadata 132 has not yet been sent to one or more DVRs of the plurality of DVRs. The MMD system 110 may then send (e.g., over network(s) 101) the recently generated media asset metadata 132 to one or more DVRs of the plurality of DVRs, such as DVR 151, in response to the determination that the recently generated media asset metadata 132 has not yet been sent. For example, DVR 151 may receive such media asset metadata and store it as media asset metadata 164 on DVR 151.

The MMD system 110 is communicatively coupled (locally or remotely) to storage facility 130, which includes media asset metadata 132, subscriber information 134, and media asset content 136. In certain implementations, the storage facility 130 may be incorporated within or otherwise directly operated by the MMD system 110; in other implementations, some or all of the functionality provided by the storage facility 130 may be provided by one or more third-party network-accessible storage service providers. The storage facility 130 may also comprise multiple separate storage facilities and streaming media content servers geographically separated from each other, each of which may provide stored media content to particular media content user locations based on a number of factors, such as geographical proximity, load balancing parameters, current demand on the storage facility 130 and/or the networks 101, capacity of the storage facility and/or the network(s), etc.

The interactions of the MMD system 110 with the MADSP 180, MPBS 190, DVR 151 and media content users 150 may occur in various ways over network(s) 101 and/or satellite television connection 168. Information may also be provided in a programmatic manner by one or more client software applications via the Application Program Interface ("API") provided by the MMD system 110, the MADSP 180, MPBS 190 and/or DVR 151 that allows computing systems and/or programs to invoke such functionality programmatically, such as using Web services or other network communication protocols. Similarly, interactions with the MMD system 110, the MADSP 180, MPBS 190 and/or DVR 151 may be provided in a programmatic manner by one or more client software applications via an API.

Each DVR 151 interconnects to one or more communications media or sources. For example, the various media content may be delivered as data via a packet-switched network such as the Internet or other packet-switched network, via satellite transmission, or other manner. The underlying connection carrying such data may be via a cable head-end, satellite antenna, telephone company switch, cellular telephone system, Ethernet portal, off-air antenna, or the like. The DVR 151 may receive a plurality of programming by way of the communications media or sources, or may only receive programming via a particular channel or source. In some embodiments, based upon selection by a user, the DVR 151 processes and communicates the selected programming to the display device 156. Also, in some embodiments, the display device 156 may also be a DVR or have DVR 151 integrated within it.

In various embodiments, examples of a DVR 151 may include or be integrated with, one or a combination of the following: a "television converter," "receiver," "set-top box," "television receiving device," "television receiver," "television," "television recording device," "satellite set-top box," "satellite receiver," "cable set-top box," "cable receiver," "media player," "digital versatile disk (DVD) Player," "computer," "mobile device," "tablet computer," "smart phone," "MP3 Player," "handheld computer," and/or "television tuner," etc. Accordingly, the DVR 151 may be a standalone device connected to a receiving device and/or may include any suitable converter device or electronic equipment that is operable to receive programming via a connection to a satellite or cable television service provider outside the media content user premises and communicate that programming to another device over a network. Further, the DVR 151 may itself include user interface devices, such as buttons or switches.

In at least the depicted embodiment, the DVR 151 is, or is connected to, a device that is configured via a digital rights management-enabled (DRM-enabled) interface 154 to receive and decrypt content received from the MMD system according to various digital rights management and other access control technologies and architectures. Furthermore, in at least some embodiments, the DVR 151 may include an API that provides programmatic access to one or more functions of the DVR 151. For example, such an API may provide a programmatic interface to one or more functions of the DVR that may be invoked by any other program, a remote control (not shown), one or more content providers and/or program distributors, one or more information providers 172, a local and/or remote content storage system, or some other module. In this manner, the API may facilitate the development of third-party software, such as various different on-demand service applications, user interfaces, plug-ins, adapters (e.g., for integrating functions of the DVR 151 into desktop applications or mobile device applications), and other functionality. In at least the depicted embodiment, the DRM-enabled interface 154 may facilitate the receiving, decrypting, decoding, processing, selecting, recording, playback and displaying of programming and media assets, as well as the establishing of an Internet Layer end-to-end security connection, such as a secure IP tunnel. The DRM-enabled interface 154 may also facilitate on-demand media services (e.g., video-on-demand or "VOD" services), on-demand program ordering, processing, and DRM and key management and storage corresponding to processing received streaming media content and other programming. In some embodiments, recorded or buffered programming received by the DVR 151 as spooled or streaming media content, or other types of programming, may reside within media asset content storage 152, either in decrypted or encrypted form as applicable for securely storing, processing and displaying of the received media content according to any applicable DRM associated with the particular programming. The media asset metadata storage 164 may also store various program metadata associated with the recorded or buffered programming stored by the DVR 151, such as that including, but not limited to, DRM data, tags, codes, identifiers, format indicators, timestamps, user identifications, authorization codes, digital signatures, etc. In addition, in some embodiments, the media asset metadata storage 164 may include user profiles, preferences and configuration data, etc.

In at least the depicted embodiment, the DVR 151 is configured to process media content (including media programming as well as interstitial media assets) and render the media content for display on the display device 156. As part of such processing, the DVR 151, in some embodiments, working in conjunction with a media content decryption and encryption engine and/or a data transmission module, may encode, decode, encrypt, decrypt, compress, decompress, format, translate, perform digital signal processing, adjust data rate and/or complexity or perform other processing on the data representing received programming and other media content as applicable for presenting the received content in real time on the display device as it is being received by the DVR 151. In various embodiments, examples of a display device 156 may include, but are not limited to, one or a combination of the following: a television ("TV"), a monitor, a personal computer ("PC"), game system, tablet device, smart phone, mobile device or other computing device or media player, and the like. Each of such display devices 156 typically employs a display, one or more speakers, and/or other output devices to communicate video and/or audio content to a user. In many implementations, one or more display devices 156 reside in or near a media content user's premises and are communicatively coupled, directly or indirectly, to the DVR 151. Further, the DVR 151 and the display device 156 may be integrated into a single device. Such a single device may have the above-described functionality of the DVR 151 and the display device 156, or may even have additional functionality.

In certain embodiments, the MMD system 110 may receive at least some programming content, such as television content, via one or more third-party content providers or associated media distributors (not depicted for purposes of clarity). Exemplary content providers and associated media distributors include television stations, which provide local or national television programming; and special content providers, which provide premium-based programming, pay-per-view programming, streaming media, and on-demand programming.

Encryption and decryption described herein may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of systems and methods for playing media assets stored on a digital video recorder (DVR) may be implemented. FIG. 1 illustrates just one example of a multichannel media distribution system 110, its users, and service providers communicatively coupled thereto, and the various embodiments discussed herein are not limited to such environments. In particular, exemplary networked environment 100 may contain other devices, systems and/or media not specifically described herein.

Figure 2:
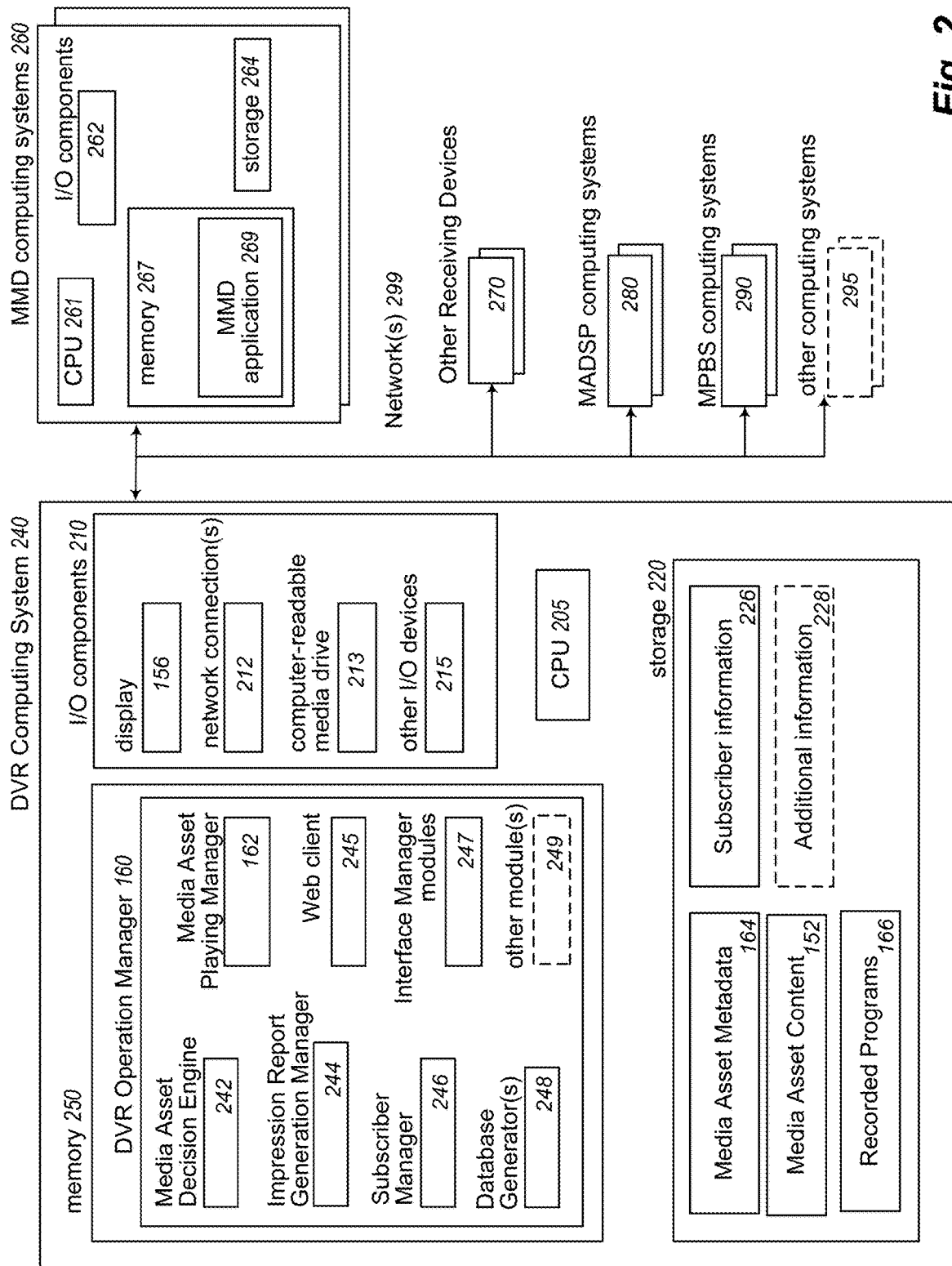
FIG. 2 is a block diagram illustrating elements of an example DVR computing system utilized in accordance with techniques described herein, according to various embodiments described herein.

FIG. 2 is a block diagram illustrating elements of an example DVR computing system 240, such as that of DVR 151 of FIG. 1, utilized in accordance with techniques described herein, according to various embodiments described herein.

The DVR computing system 240 includes one or more central processing units ("CPU") or other processors 205, various input/output ("I/O") components 210, storage 220, and memory 250, with the illustrated I/O components 210 including a display 156, network connection(s) 212, a computer-readable media drive 213, and other I/O devices 215 (e.g., I/O ports, physical or virtual control buttons, keypads, touch screens, panel displays, remote control device transceivers, microphones, speakers, GPS receivers, etc.). The DVR computing system 240 and MMD system 260 may communicate with other computing systems via one or more networks 299 (which generally function as described with respect to network(s) 101 of FIG. 1), such as other receiving devices 270, MADSP computing systems 280, MPBS computing systems 290, and other computing systems 295, such as those of Information Provider 172 of FIG. 1. For example, an Internet-connected DVR computing system 240 may communicate over the Internet with other systems via Web client 245, e.g., to receive media asset metadata 164, media asset content 152, subscriber information 226 and/or other additional information 228 from MADSP computing systems 280, MPBS computing systems 290, other computing systems 295 and/or other receiving devices 270. Some or all of the computing systems shown in FIG. 2 may similarly include some or all of the types of components illustrated for DVR computing system 240 (e.g., to have an MMD system client application 269 executing in memory 267 of an MMD computing system 260 in a manner analogous to DVR computing system 240 in memory 250, with the DVR operation manager 160 further including I/O components 262 and computer-readable storage 264).

In the illustrated embodiment, an embodiment of the DVR computing system 240 executes in memory 250 in order to perform at least some of the described techniques, such as by using the processor(s) 205 to execute software instructions of the DVR computing system 240 in a manner that configures the processor(s) 205 and DVR computing system 240 to perform automated operations that implement those described techniques. As part of such execution, the DVR computing system 240 operates in conjunction with multiple submodules to support the described techniques. In particular, in the depicted embodiment the DVR computing system 240 includes DVR operation manager 160 that controls operation of the DVR. The DVR operation manager 160 may include a media asset playing manager 162; a media asset decision engine 242; an impression report generation manager 244; a Web client 245; a subscriber manager module 246 (which manages subscriber information 226); one or more interface manager modules 247 (which manage I/O components 210); one or more database generators 248; and may further include one or more other modules 249. As part of such automated operations, the DVR computing system 240, its depicted components and/ or other optional programs or modules 249 executing in memory 250 may store and/or retrieve and use various types of data, including in the example media asset metadata 164, media asset content 152, recorded programs 166, subscriber information 226 and additional information 228 stored in the DVR storage 220 and information related to one or more multichannel media distribution systems and/or media programming broker services.

In one embodiment, the media asset playing manager 162 receives an indication of a selection of a recorded program stored in the recorded programs 166 on DVR computing system 240. The selection of the recorded program may be for playing the recorded program from a beginning of the recorded program. In response to receiving the indication of the selection, the media asset playing manager 162 may determine whether to automatically play a media asset stored in media asset content 152 before playing the recorded program from the beginning of the recorded program. This determination may be based on media asset metadata 164 associated with one or more of: the DVR computing system 240, the media asset stored in media asset content 152, and the recorded program stored in recorded programs 166. In response to or in conjunction with the media asset playing manager 162 determining to play a media asset before playing the recorded program, the media asset decision engine 242 may select the media asset for playing from a plurality of media assets stored on in the media asset content 152 also based on the media asset metadata 164 associated with one or more of: the DVR computing system 240, the media asset stored in media asset content 152, and the recorded program stored in recorded programs 166. In various embodiments, the media asset playing manager 162 may send a communication to the media asset decision engine 242 to cause the media asset decision engine 242 to select the media asset for playing from a plurality of media assets stored on the DVR 151. In response to the communication to the media asset decision engine 242, the media asset playing manager 162 may receive an identifier of the selected media asset in order to perform automatically playing of the selected media asset in response to reading a break and a cue stored in media asset metadata 164 on the DVR 151. In various embodiments, the media asset decision engine 242 may identify the media asset (e.g., advertisement) for playing based on an identifier or other relevant data included in the stored media asset metadata 164 that identifies the category of the recorded program, which is a category of media assets stored within media asset content 152 on the DVR 151 from which to select. For example, the identifier included in the stored media asset metadata 164 may identify a specific collection of media assets stored in media asset content 152 from which to select (which may also be also associated with a particular advertiser or seller). The category of the recorded program (e.g., particular category of content of the recorded program) on which media asset selection is based may be associated with a particular advertiser or seller.

In some embodiments, the media asset decision engine 242 may be located remotely from the DVR 151 and accessible over network(s) 101 and/or satellite connection 168, such as in for example, the MPBS computing system 290, the MADSP computing system 280 or the MMD computing system 260. Also, the MADSP computing system 280 may use status report messages from one or more DVR devices, such as from impression report generation manager 244 of DVR computing system 240, to track impressions for substantive analysis and accountability, to derive qualitative information, and/or for calculation of various performance metrics.

It will be appreciated that DVR computing system 240 and devices/systems 260, 270, 280, 290, and 295 are merely illustrative and are not intended to limit the scope of the present invention. The systems and/or devices may instead each include multiple interacting computing systems or devices, and may be connected to other devices that are not specifically illustrated, including through one or more networks such as the Internet, via the Web, via satellite transmission, or via private networks (e.g., mobile communication networks, etc.). More generally, a device or other computing system may comprise a specific combination of hardware that may interact and perform the described types of functionality, optionally when programmed or otherwise configured with particular software instructions and/or data structures, including without limitation, desktop or other computers (e.g., tablets, slates, etc.), database servers, network storage devices and other network devices, smart phones and other cell phones, consumer electronics, digital music player devices, handheld gaming devices, PDAs, wireless phones, electronic organizers, Internet appliances, television systems, and various other consumer products that include appropriate communication capabilities. In addition, the functionality provided by the illustrated DVR computing system 240 may, in some embodiments, be distributed in various modules. Similarly, in some embodiments, some of the functionality of the DVR computing system 240 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments, some or all of the software modules and/or systems may execute in memory on another device and communicate with the illustrated computing systems via inter-computer communication. Thus, in some embodiments, some or all of the described techniques may be performed by hardware that includes one or more processors and/or memory and/or storage when configured by one or more software programs (e.g., the DVR computing system 240 and/or MMD client software executing on devices/systems 260, 270, 280, 290, and/or 295) and/or data structures, such as by execution of software instructions of the one or more software programs and/or by storage of such software instructions and/or data structures. Furthermore, in some embodiments, some or all of the systems and/or modules may be implemented or provided in other manners, such as those that are implemented at least partially in firmware and/or hardware (e.g., rather than being implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on one or more non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also, in some embodiments, be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

In various embodiments, one or more components/modules of the DVR computing system 240, as well as various components/modules of the computing systems described herein, may be implemented using standard programming techniques. For example, such components/modules may be implemented as a "native" executable running on one or more processors (such as CPU(s) 205 and/or CPU(s) 261 of FIG. 2), along with one or more static or dynamic libraries. In other embodiments, such components/modules may be implemented as instructions processed by a virtual machine that executes as another program. In general, a range of programming languages may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, PHP, jQuery, and the like), or declarative (e.g., SQL, Prolog, and the like).

The embodiments described herein may also use well-known or other synchronous or asynchronous client-server computing techniques. However, the various components may be implemented using more monolithic programming techniques as well, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve desired functions.

In addition, programming interfaces described herein may be available by standard mechanisms, such as through C, C++, C#, and Java APIs; libraries for accessing files, databases, or other data repositories; scripting languages such as XML; or Web servers, FTP servers, NFS file servers, or other types of servers providing access to stored data. As non-limiting examples, storage facility 130 of FIG. 1 and/or storage 220 of FIG. 2 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner, including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve desired functions.

Figure 3:
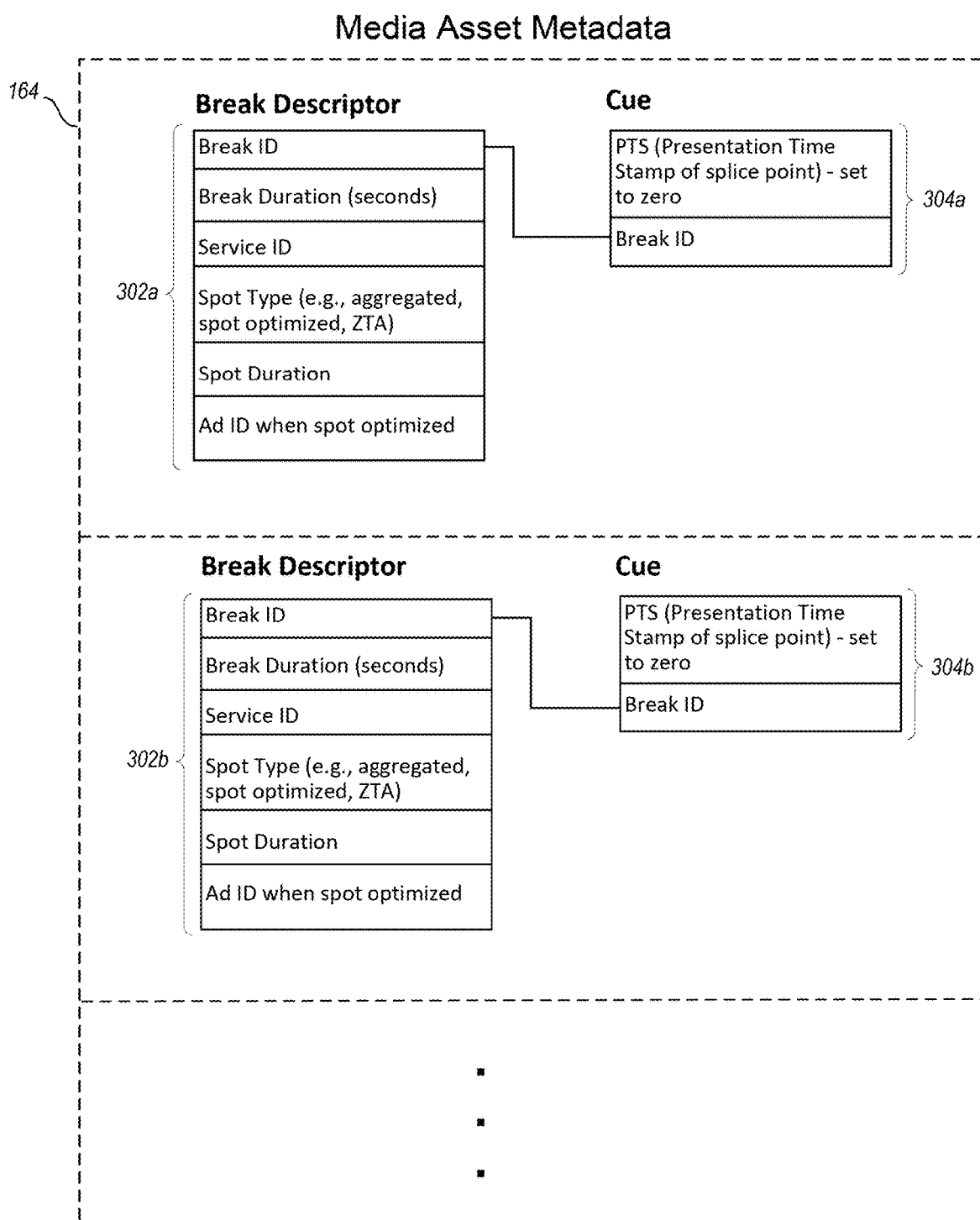
FIG. 3 is a diagram of an example structure and type of content that media asset metadata may have utilized in accordance with techniques described herein, according to various embodiments described herein.

FIG. 3 illustrates an example structure and type of content 300 that media asset metadata 164 may have utilized in accordance with techniques described herein, according to various embodiments described herein.

In the present example, media asset metadata 164 may include information used to determine if and when a media asset is to be presented and/or to dynamically select the media asset for presentation. The media asset metadata 164 may be communicated to and stored by a DVR, such as DVR 151 of FIG. 1, such that a media asset stored on the DVR is selected and played upon selection of a recorded program for playing or upon some other event occurring or condition or criteria being satisfied. For example, the event occurring, or condition or criteria being satisfied, may be associated with the user and/or particular set-top-box or receiving device (e.g., DVR 151). Depending on values of content of the media asset metadata 164, the media asset metadata 164 may be used by the DVR 151 to play a specific media asset upon any recorded program being selected to be played, upon a specific recorded program being selected to be played, or upon some or other event occurring or condition or criteria being satisfied. In some embodiments, depending on values of the content of the media asset metadata 164, such media asset metadata 164 may cause a media asset to be selected and played based on a number of criteria including, but not limited to: the type of category of recorded program selected to be played, the type of ad spot ordered for a particular media asset, characteristics of the user or DVR 151, particular events or conditions being satisfied associated with the user and/or DVR 151, a particular user menu being selected and/or displayed by the DVR 151, user account status, particular user customer service issues, messages, calls or chats occurring, etc.

In the present example, the media asset metadata 164 may include a plurality of Break Descriptors 302a, 302b, etc., and associated Cues 304a, 304b, etc. There may be multiple different Break Descriptors 302a, 302b, etc., and associated Cues 304a, 304b, etc., associated with various different media assets, orders generated, DVR events, specific conditions being satisfied, specific events occurring, DVR services and/or recorded programs. In the illustrated example, Break Descriptor 302a is associated with Cue 304a and Break Descriptor 302b is associated with Cue 304b via a common break identifier (Break ID). In one example, the portion of media asset metadata comprising the Break Descriptor 302a and associated with Cue 304a consists of 188 byte transport stream packets to be delivered to the DVR 151 over network(s) 101 shown in FIG. 1 (e.g., from MMD system 110). The Break ID generally refers to an identification of a break in television programming designated for media asset insertion and the Break Duration indicates the length of such a break. The service identifier (Service ID) may identify a particular television broadcast channel received by the DVR 151 as an addressable service on which a media asset is to be inserted. In the present embodiment, in some of media asset metadata 164, the Service ID may identify an addressable service of the DVR 151, such as a service of the DVR 151 that plays recorded programs. A Service ID that identifies a service of the DVR 151 that plays recorded programs, such as the Service ID of Break Descriptor 302a, is one of a plurality of Service IDs stored on the DVR 151 in media asset metadata 164. In the present embodiment, the plurality of Service IDs also includes one or more other Service IDs that each identifies a different television broadcast channel received by the DVR 151 as an addressable service.

The media asset playing manager 162 of DVR 151 may use the media asset metadata 164 to determine whether to automatically play a media asset before playing the recorded program. In an example embodiment, this may include determining whether a cue (e.g., cue 304a) included in the media asset metadata 164 stored on the DVR 151 is associated with a particular media asset and the recorded program, and determining whether to automatically play the media asset before playing the recorded program based on this determination. For example, the media asset playing manager 162 may determine whether the cue 304a has Break ID that is associated with Service ID that identifies an addressable service of the DVR that plays the recorded program. In another embodiment, when a user selects a recorded program for playing, the media asset playing manager 162 of DVR 151 may determine to automatically play a media asset by finding a break descriptor (e.g., break descriptor 302a) that has a Service ID that matches the service ID of the service of the DVR 151 that plays the recorded program. The media asset playing manager 162 may then read other data within the break descriptor 302a and associated cue 304a to select, possibly in conjunction with the media asset decision engine 242, the media asset to play before playing the selected recorded program.

The presentation time stamp (PTS) indicates the splice point within the program (or in some embodiments, within the break) at which the media asset is to be inserted. For media asset metadata with a Service ID identifying a service of the DVR 151 that plays recorded programs, the PTS may be set to zero. Thus, when a recorded program stored on the DVR 151 is selected to be played, the media asset playing manager 162 of the DVR 151 will use the previously stored media asset metadata 164 having a Service ID matching the particular service of the DVR 151 that plays recorded programs to identify or select the media asset and, as a result of the PTS being set to zero, will play the media asset immediately before playing the recorded program according to the particular information in the media asset metadata 164. Also in some embodiments, the PTS may be set such that the media asset plays after the recorded program finishes playing or another Service ID may be associated with finishing of playing the recorded program such that when the recorded program finishes being played, the DVR 151 will use the previously stored media asset metadata 164 having a Service ID matching the particular service of the DVR 151 associated with finishing of playing the recorded program to select and play a media asset media asset immediately after the recorded program finishes playing according to the particular information in the media asset metadata 164.

In some embodiments, different Service IDs may be associated with playing corresponding different types or categories of recorded programs. For example, there may be a specific Service ID for playing recordings of sports events or sports programs, another Service ID for playing of documentaries, another Service ID for playing of television drama series, and yet another Service ID for playing of children's cartoons, etc. Thus, the selection of the media asset may be based on the category of recorded program to be played by using Service ID designated for playing recorded programs of that specific category. For example, a beer ad may be selected when the service on the DVR for playing recorded sports programs is invoked and a toy ad may be played when the service on the DVR for playing recorded children's cartoons is invoked. Thus, advertisers or other ad spot purchasers may generate an order to have their ad played when a recorded program associated with a particular category or having a particular characteristic is selected to be played. Such media asset selection, for example, may be performed by the media asset decision engine 242 of the DVR operation manager 160. Different Service IDs may also be associated with different operations or activities of the DVR. For example, a specific Service ID may be associated with invoking the DVR help menu, settings menu, electronic program guide, or other guide or menu, such that a specific video, image or other message stored on the DVR 151 is presented or overlaid on the menu or guide when the corresponding menu or guide is invoked.

In various embodiments, different addressable services that a different Service IDs may identify or be associated with may include, but are not limited to: a service that plays recorded programs; a service that plays a specific type of recorded program (e.g., a Service ID associated with playing sports programs, a Service ID associated with playing news programs, a service ID associated with playing a specific genre of movie, etc.); a service to play a specific recorded program; a service associated with finishing of playing recorded program; a service associated with a particular status of the DVR; a service associated with presenting a particular electronic program guide or menu; a service associated with a condition for contacting the user being satisfied; a service associated with a service signal interruption being detected; and a service associated with a particular event or condition associated with the set-top-box or user being satisfied. Thus, when a particular service is invoked, activated or performed, the DVR will use media asset metadata 164 having a Service ID matching the particular service invoked, activated or performed to select and play one or more media assets in conjunction with invoking, activating or performing the service.

Also included in the media asset metadata 164 is the Spot Type. A "spot" generally refers to a location in a break into which media asset can be placed and the Spot Duration refers to the length of the spot. In the present embodiment, the Spot Type may be utilized to indicate how the media asset to play is to be selected by the DVR 151. For example, a Spot Type of "aggregated" may indicate to the DVR 151 that the media asset decision engine 242 of the DVR 151 is to select the particular media asset. For example, the media asset decision engine 242 may select the media asset from the media asset content 152 (or a subset of the media asset content 152) that is most relevant for the current user or users. In some embodiments, the media asset decision engine 242 may select the media asset based on the profile, demographics or other characteristics of the user or household associated with DVR 151. Information regarding the user or household associated with DVR 151 may be based on information stored on the DVR 151 and/or the subscriber information 134 communicated from the MMD system 110 to the media asset decision engine 242.

Also or instead, the media asset decision engine 242 may select the media asset from the media asset content 152 based on the content, category or other characteristic of the recorded program selected to be played. For example, a specific Service ID may be associated with or identifies a service that plays recorded programs falling in a particular category or having a particular characteristic. Thus, advertisers or other ad spot purchasers may generate an order to have their ad played when a recorded program associated with a particular category or having a particular characteristic is selected to be played. In some embodiments, there may be a unique service ID associated with playing recorded programs that have not been categorized within a particular pre-set category, such that orders may be placed for ad insertion when a particular category is not applicable and the media asset decision engine 242 will select the media asset to be played accordingly.

As another example, a Spot Type of "spot optimized" may indicate that the specific media asset is identified directly by the media asset metadata 164, instead of having the media asset decision engine 242 determine which media asset to play from a plurality of media assets stored in the media asset content 152. For example, in the case of a "spot optimized" Spot Type, the specific media asset to play may be directly identified by the value of the advertisement identifier (Ad ID) of the media asset metadata 164 and thus, the media asset decision engine 242 is not invoked to select the media asset, as it is directly identified by the value of the Ad ID of the media asset metadata 164. The DVR 151 may also track an advertisement impression in response to the automatic playing of the media asset before and/or after the playing the recorded program. For example, this may be based on an indication in the media asset metadata 164 stored on the DVR 151 of one or more of: an owner of the media asset, an advertiser associated with the media asset and an entity from which an order to play the media asset was received.

As another example, a Spot Type of "ZTA" (Zone Target Area) indicates to select a media asset according to a virtual zone that can be used to define a subset of viewers from a larger physical zone. For example, the DVR 151 may be identified with a particular virtual zone based on geography and/or other characteristics of the DVR 151 or associated user. In some embodiments, if the Spot Type is detected as "ZTA," then the media asset decision engine 242 selects a media asset according to a particular zone within which the DVR 151 or user associated with the DVR 151 falls. Alternatively, the MMD system 110 may send different media assets and media asset metadata 164 to different DVRs depending on whether the Spot Type indicated is "ZTA" and the particular DVR falls within the specific zone for that "ZTA" Spot Type.

Figure 4:
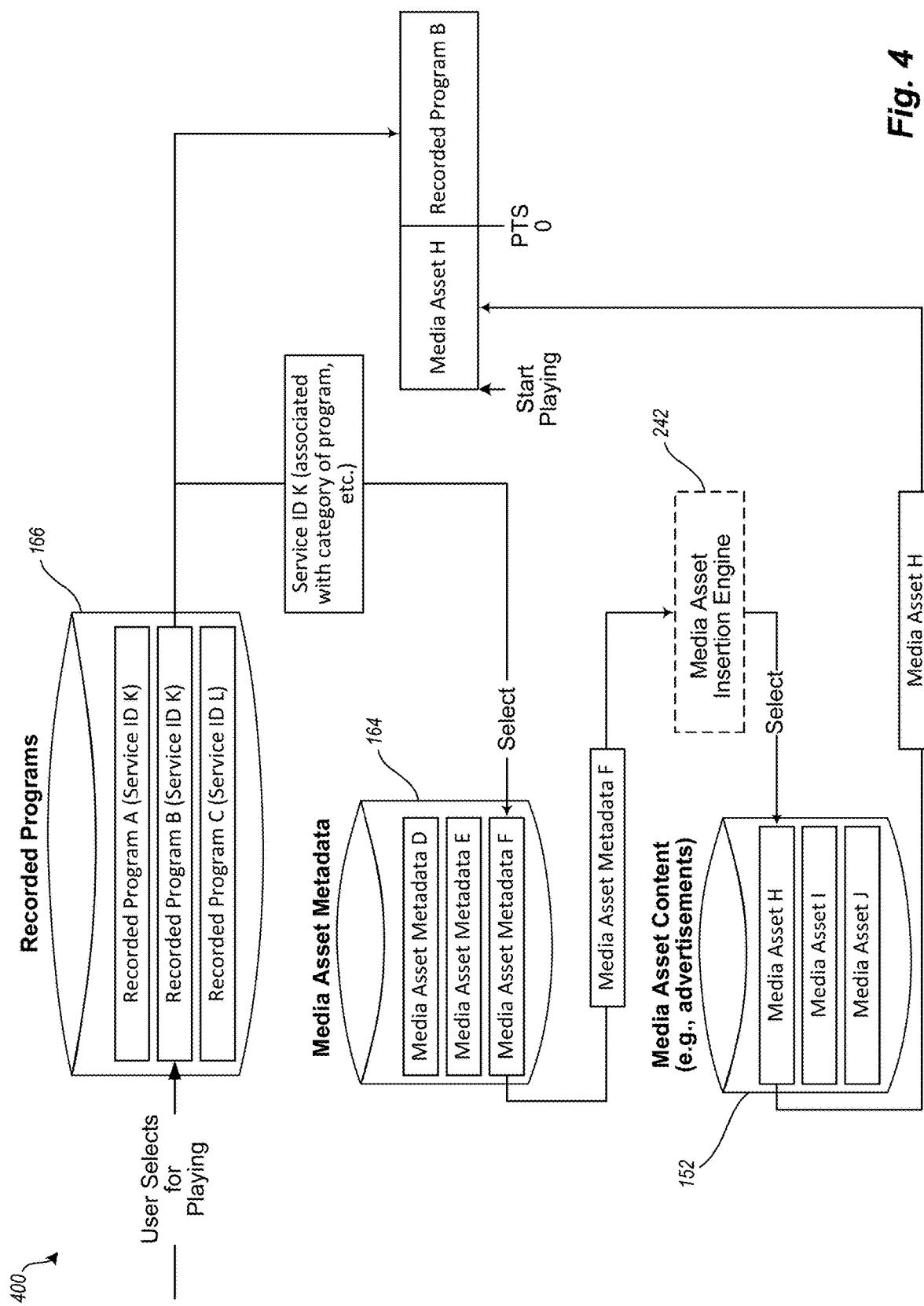
FIG. 4 is a block diagram illustrating data sources and informational flow depicting how media asset metadata may be used to select a media asset for playing before playing of a recorded program upon selection of the recorded program in accordance with techniques described herein, according to various embodiments described herein.

FIG. 4 is a block diagram illustrating data sources and informational flow 400 depicting how media asset metadata may be used to select a media asset for playing before playing of a recorded program upon selection of the recorded program in accordance with techniques described herein, according to various embodiments described herein.

In an example embodiment, a user selects to play Recorded Program B from recorded programs 166 stored on DVR 151. DVR 151 then uses the Service ID assigned to the service of the DVR 151 that plays recorded programs (or recorded programs of that category) to select media asset metadata associated with playing of that recorded program. For example, Service ID K may be associated with selected recorded program B because recorded program B falls within the sports category and Service ID K is the Service ID of the particular DVR service that plays recorded sports programs. The DVR 151 then finds in a database of media asset metadata 164, media asset metadata associated with Service ID K. In the present example, Media Asset Metadata F is selected from media asset metadata 164 because Media Asset Metadata F is determined to be associated with Service ID K (e.g., because Service ID K is stored in the break descriptor of Media Asset Metadata F).

Depending on the values of particular variables stored in Media Asset Metadata F, the DVR 151 selects from media asset content 152 a particular media asset (e.g., Media Asset H) to automatically play immediately before stating to play Recorded Program B from the beginning of that program. For example, if Media Asset Metadata F has values indicating a Spot Type of "aggregated", this may indicate to the DVR 151 that the media asset decision engine 242 of the DVR 151 is to select the particular media asset from the media asset content 152 that is most relevant for the current user or users given the sports category associated with Service ID K. In other embodiments, a Spot Type of "spot optimized" may indicate that the specific media asset is identified directly by an Ad ID stored in Media Asset Metadata F, in which case the media asset decision engine 242 may be bypassed and the media asset found within the media asset content by directly identifying it using the Ad ID.

DVR 151 then automatically plays selected Media Asset H immediately before stating to play Recorded Program B from the beginning of that program. In some embodiments, the DVR 151 automatically plays the Media Asset H before playing the Recorded Program B from the beginning of the Recorded Program B in response to reading a break and a cue stored in media asset metadata 164 and associated with the recorded program, the cue having a PTS set to correspond to a beginning of Recorded Program B, causing the Media Asset H to play immediately before playing Recorded Program B from the beginning of the Recorded Program B. This may be caused by the PTS variable stored in a cue within Media Asset Metadata F which indicates the splice point within the program at which the media asset is to be inserted being set to zero. Thus, as zero indicates a presentation time immediately before the recorded program begins, as a result of the PTS being set to zero, the DVR 151 will play Media Asset H immediately before stating to play Recorded Program B from the beginning of that program.

In some embodiments, the DVR 151 may associate the Recorded Program B stored in recorded programs 166 on DVR 151 with an addressable service (e.g., by the recorded program being selected to be played). The DVR 151 determines that the stored metadata 164 (e.g., Media Asset Metadata F) includes a service identifier (e.g., Service ID K) indicating the addressable service associated with the recorded program stored on DVR 151. The DVR 151 then selects the media asset for playing (e.g., Media Asset H) from the plurality of media assets stored in media asset content 152 on the DVR 151 based on the determination that the stored metadata (e.g., Media Asset Metadata F) includes a service identifier (e.g., Service ID K) indicating the addressable service for playing recorded programs associated with Recorded Program B stored on the DVR 151.

Also, in some embodiments, the media asset playing manager 162 of DVR 151 determines not to play a media asset before playing the recorded program based on a criterion associated with an attribute of the recorded program. This attribute of the program may be determinative of whether to play a media asset before playing recorded programs having that attribute. For example, some recorded content has a skip feature attribute that allows the user to skip over advertisements associated with the recorded content. Thus, the criterion associated with the attribute may indicate to not automatically play any media assets that are advertisements before playing recorded programs for which there is the ability of a user of the DVR to skip over advertisements associated with the recorded programs. This may help to prevent interference with such features to skip ads and align with policies for calculating ad impressions.

Furthermore, in some embodiments, the DVR 151 allows such media assets to play only upon the recorded program being selected to play from a beginning of the recorded program, as opposed to upon resuming play of the recorded program. This avoids interference with interstitial advertisements already recorded along with the recorded program and other dynamic ad insertion cues already embedded within the recorded program content stream. In some embodiments, media assets that are to be played upon the recorded program being selected are in addition to any media assets to be inserted based on existing embedded breaks and cues in the recorded program. For example, the DVR 151 may receive an indication of a selection of the recorded program stored on the DVR 151 to resume playing from other than a beginning of the recorded program (e.g., as indicated by a PTS corresponding to a point at which the recorded program it at when being resumed). In response, the DVR 151 determines to not automatically play a media asset before resuming playing of the recorded program, which may be in addition to any media assets to be dynamically inserted based on existing embedded breaks and cues in the recorded program. The DVR 151 then resumes playing of the recorded program.

Additionally or instead, in some embodiments, a media asset may be played upon the recorded program finishing being played. For example, the DVR 151 may receive an indication of finishing of playing a recorded program stored on the DVR 151. In response to the receiving of this indication, the DVR 151 may determine whether to automatically play a media asset immediately after finishing playing the recorded program and, based on a determination to play the media asset, will automatically play the media asset immediately after finishing playing the recorded program. This automatic playing of the media asset immediately after finishing playing the recorded program may occur in response to reading a cue stored in the media asset metadata 164 and associated with the recorded program. For example, the cue may have a presentation time stamp set to correspond to an ending of the recorded program, causing the media asset to play immediately after finishing playing the recorded program. Alternatively, a specific Service ID may be associated with finishing of playing a specific recorded program (or any recorded program) such that when the recorded program finishes being played, the DVR 151 will use the previously stored media asset metadata 164 having a Service ID matching the particular service of the DVR 151 associated with finishing of playing the recorded program to select and play a media asset immediately after the recorded program finishes playing.

In some instances which may be detected by the media asset playing manager 162, the media asset playing manager 162 may restrict playing all media assets, some particular media assets, or one or more specific types or categories of media assets. This restriction may be a blanket restriction or a restriction that applies in limited circumstances, such as restricting media assets from playing that would otherwise play upon selection of a recorded program for playing. For example, if a particular user or household associated with the DVR 151 has already voted in a political election, the media asset playing manager 162 may determine to restrict playing political advertisements related to that election which would otherwise have been selected by the media asset decision engine 242 for play by the media asset playing manager 162. The determination to restrict playing of a particular advertisement may be based on a determination that the user has voted in the particular election and that the political advertisement is related to the particular election. The media asset playing manager 162 may determine that the user has voted in the particular election based on electronically accessing one or more of: data input by the user indicating the user has voted in the particular election, a date of the particular election, data retrieved from an electronic voting system, and electronic voting records. For example, data retrieved from an electronic voting system and/or electronic voting records may be accessed from a remote source such as information provider 172 of FIG. 1. In some embodiments, the MMD computing system 110, the MADSP computing systems 280, and/or MPBS computing systems 290 may collect or retrieve such information and communicate this information to the DVR 151 and/or make the determination whether the user has voted in the particular election based on such information. The MMD computing system 110, the MADSP computing systems 280, and/or MPBS computing systems 290 may then communicate that determination to the media asset playing manager 162 to act on accordingly in order to restrict playing of such political advertisements.

In various embodiments, such restrictions of playing particular media assets may be based on a variety of different criteria. In one embodiment, the media asset playing manager 162 determines whether a criterion regarding a user or household associated with DVR 151 has been met. The media asset playing manager 162 then determines to restrict playing of the media asset before playing the recorded program (or in some instances, restricts playing of the media asset at any time) based on a determination that the criterion regarding a user or household associated with DVR 151 has been met. The media asset metadata 164 may include data used to determine whether the criterion has been met. For example, the media asset metadata 164 may include attributes of a particular media asset or group of media assets that may potentially be played (e.g. based on the particular Service ID in the media asset metadata 164). In some instances, the media asset metadata 164 may include data indicative of or used to identify the type, a category, content or other characteristics of a particular media asset or group of media assets to which the metadata may apply. In one example, if the media asset playing manager 162 has determined that the user or household has already voted in a particular election, when the media asset playing manager 162 is about to play a media asset, the media asset playing manager 162 may determine that the media asset to be played is a political advertisement related to that election based on the media asset metadata 164 directly identifying the specific political advertisement and/or the corresponding "Ad Owner ID" in the media asset metadata 164 being a politician or political group associated with that particular election. In response, the media asset playing manager 162 may then determine to restrict playing of that media asset accordingly and perhaps even replace it with a different media asset or advertisement, as selected by the media asset decision engine 242. As another example, if the media asset playing manager 162 has determined that the user or household has already responded to the US census, the media asset playing manager 162 may restrict playing of advertisements to respond to the census. As additional example, if the media asset playing manager 162 has determined that the user is not a licensed driver or the household does not have any licensed drivers, the media asset playing manager 162 may restrict playing of advertisements for automobiles. In this manner, target groups for advertisers may be automatically selected more accurately and efficiently, and prices for ad spots set accordingly. Determinations by the media asset playing manager 162 regarding such status of the user and/or household associated with the DVR 151 may be made based on the media asset playing manager 162 accessing publicly available electronic records, databases and/or information for which the user or household has opted in to provide (e.g., for the purpose of restricting irrelevant or undesirable advertisements or messages being received).

In some embodiments, the media asset playing manager 162 may restrict playing of such media assets at any time. In other embodiments, the media asset playing manager 162 may restrict certain media assets from being played that would otherwise play automatically upon selection for playing of recorded programs 166 stored on the DVR 151. In some embodiments, this determination to restrict playing of a particular media asset may occur before the media asset decision engine 242 selects a particular media asset due to the particular media asset being directly identified in the media asset metadata 164, and the media asset playing manager 162 determining that the particular media asset (or type or category of media asset) is restricted based on the criterion being met.

Figure 5:
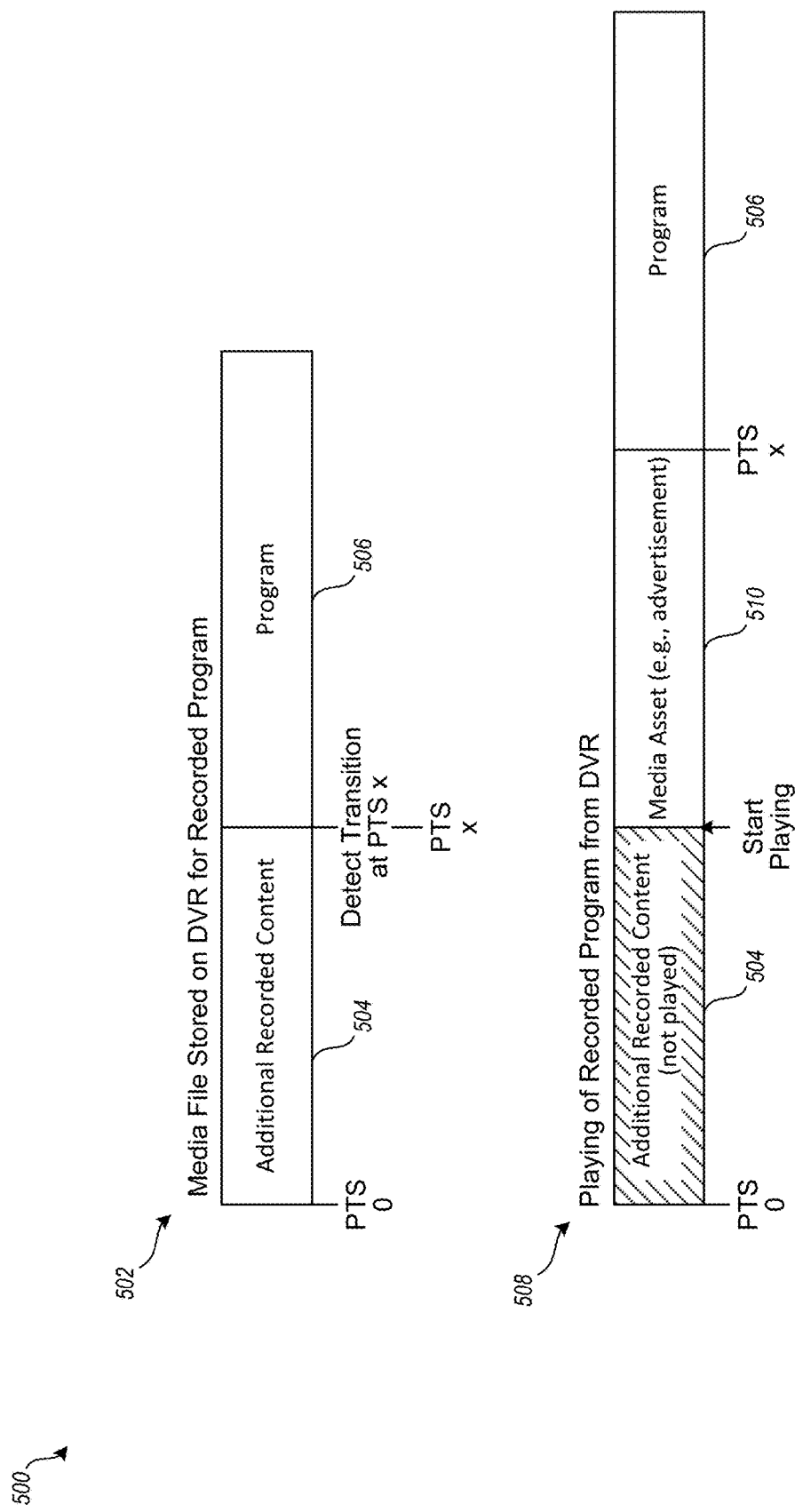
FIG. 5 is a diagram of an example structure of a media file stored on a DVR for a recorded program and how a selected media asset is played at the beginning of the recorded program in accordance with techniques described herein, according to various embodiments described herein.

FIG. 5 is a diagram of an example structure 500 of a media file 502 stored on a DVR for a recorded program 506 and how a selected media asset 510 is played 508 at the beginning of the recorded program 506 in accordance with techniques described herein, according to various embodiments described herein.

It often occurs that advertisements, parts of advertisements or other extra content that occurs before and/or after the actual program is recorded along with the program content. This extra content may include advertisements, announcements, and program content of television or movies other than the recorded program occurring in a recorded content stream before the beginning of the recorded program in the recorded content stream. Recoding of this content may occur accidentally or as a result of timing the recording to start a specific amount of time before the program is scheduled to begin and/or to end a specific amount of time after the program is scheduled to end. In some instances, such recording settings may be made in order to avoid the actual start or ending of the program being cut off in the recording. The DVR 151 may automatically avoid playing such extra content and play a selected media asset instead from the beginning of the recorded program upon selection of the recorded program for playing. In one embodiment, this is technically achieved by the DVR 151 receiving an indication of a selection of a recorded program for playing (e.g., program 506) that is stored on the DVR 151. In response to receiving the indication, the DVR 151 determines whether to automatically play a media asset (e.g., media asset 510) from media asset content 152 before playing the recorded program 506 from the beginning of the recorded program. The DVR 151 determines the beginning of the recorded program 506 from a media file 502 of recorded content stored in recorded programs 166 that includes the recorded program 506 and content other than the recorded program (e.g., additional recorded content 504) before the beginning of the recorded program 506. The DVR 151 then begins to play the recorded program 506 from the beginning of the recorded program 506 based on the determined beginning of the recorded program.

The DVR 151 may determine the beginning of the recorded program by detecting an event transition indicative of a transition between the content other than the recorded program (e.g., advertisements) and the beginning of the recorded program. The DVR may 151 determine the beginning of the recorded program based on the event transition. In the present example, the DVR 151 detects an event transition at particular time x in the recorded content of media file 502 (denoted by PTS x). Based on this detected event transition, instead of playing the recorded program by playing the media file 502 as-is after playing selected media asset 504, the DVR 151 starts playing the media file from PTS x after playing the media asset 510. In some embodiments, the PTS shown in FIG. 5 may be relative to a reference time associated with a beginning of content of the media file 502 and may be different that the PTS set in the media asset metadata 164 that may be intended to indicate when to start playing the media asset 510 relative to the beginning of the actual program.

In another embodiment, the DVR may also or instead detect the end of the recorded program by detecting an event transition indicative of a transition between the content other than the recorded program (e.g., additional recorded content) and the end of the recorded program. Based on this detected event transition, instead of playing the selected media asset after playing the entire media file as-is (including the content other than the recorded program), the DVR 151 stops playing the media file containing the recorded program at the detected event transition after the program ends and immediately starts playing the selected media asset (e.g., a dynamically selected advertisement).

In some embodiments, the media file may instead first be cut or trimmed prior to playing to remove the additional recorded content, such as in response to selection of the recorded program for playing or in response to selection of the media asset by the DVR 151, or as indicated by the media asset metadata 164.

Detection of an event transition may be performed based on one or more of: markers in the recorded program indicative of an event transition; audio fingerprint of the content other than the recorded program distinguishing the content other than the recorded program and the beginning of the recorded program; metadata indicative of an event transition; characteristics of content of the recorded program compared to characteristics of the content other than the recorded program; difference in audio levels between the recorded program and the content other than the recorded program; feature extraction of the content other than the recorded program and the recorded program; detected indications of scene breaks between the content other than the recorded program and the beginning of the recorded program; a time of scheduled broadcast of the recorded program compared to a time that recording of the of recorded content including the recorded program actually started.

In some embodiments, the DVR 151 may, after playing the recorded program, automatically list one or more selectable events related to the recorded program that a user may select to play after playing the recorded program. For example, the DVR 151 may electronically determine an ending of the recorded program based on another event transition and then, after playing the recorded program, at the time of or otherwise based on the determined ending of the recorded program, automatically list one or more related selectable events available to be played. The related events may be found by the DVR 151 using a data search mechanism of the DVR Operation Manager 160 and/or Media Asset Playing Manager 162 to find related events (e.g., stored on the DVR 151, at other locations and/or available via on-demand or one or more streaming services). This search may be performed, for example, by searching based on one or more various characteristics of the recorded program and/or selectable events, including, but not limited to: title; genre; series; category; rating; the next episode, program or movie after the recorded program in a series including the recorded program; actors; subject matter; director; cast; release date; whether the selectable event has already been viewed; Service ID indicating the addressable service associated with the recorded program; Service ID indicating the addressable service associated with a selectable event; where and/or when the selectable event is stored or available; etc. For example, after playing the recorded program, the DVR 151 may automatically list the next episode stored on the DVR 151 after the recorded program in a television series including the recorded program. Also or instead, after playing the recorded program, the DVR 151 may automatically list the next episode available on-demand or via one or more streaming services after the recorded program in a television series including the recorded program.

Figure 6:
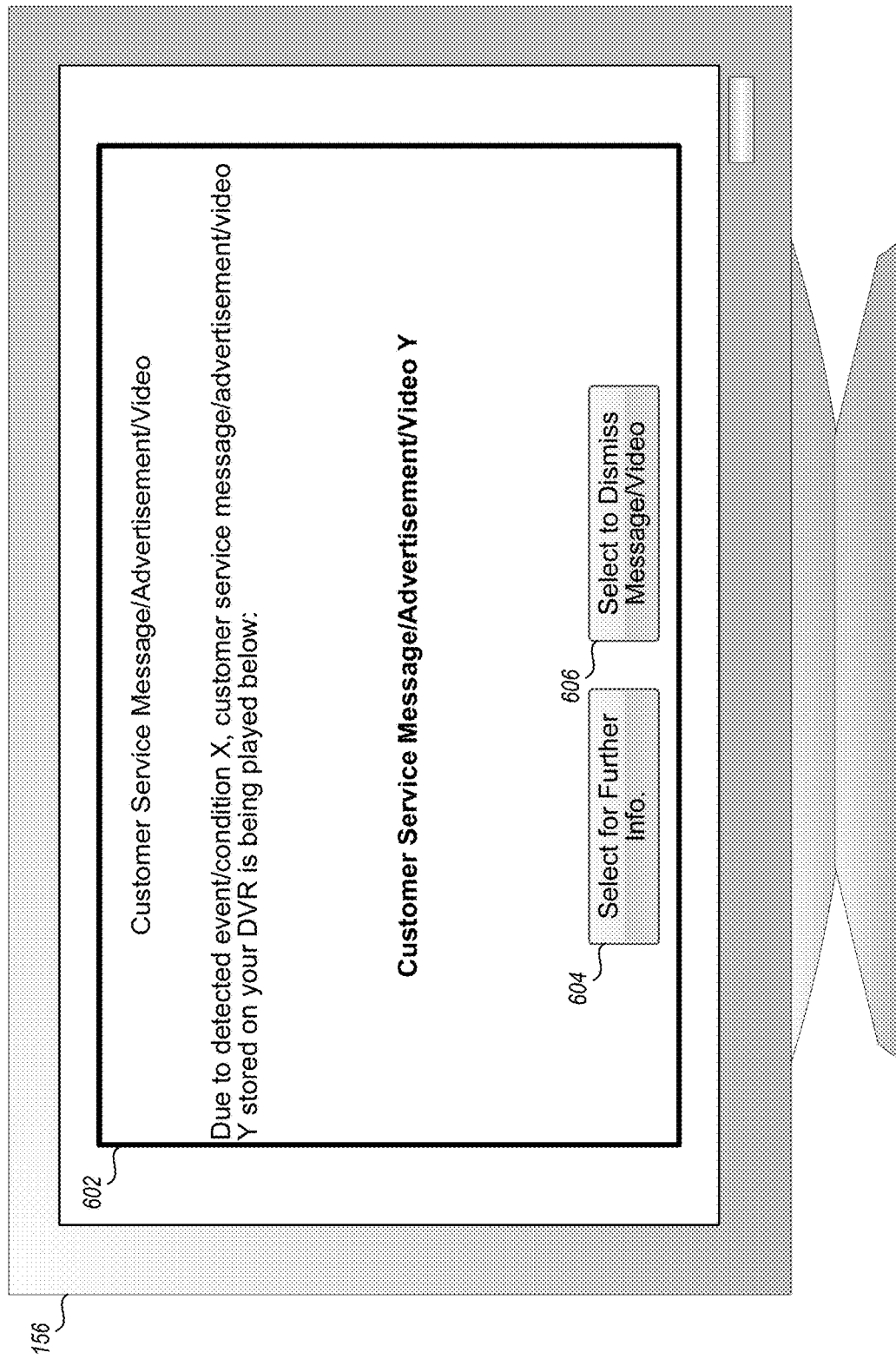
FIG. 6 is an elevational view of an example display of a receiving device displaying an example customer service message/advertisement/video stored on the receiving device being played by the receiving device upon a detected event or condition, according to various embodiments described herein.

FIG. 6 is an elevational view of an example display 156 of a receiving device (e.g., DVR 151) displaying an example customer service message/advertisement/video stored on the receiving device being played by the receiving device upon a detected event or condition, according to various embodiments described herein.

A large amount of time and resources are spent responding to customer service issues over the phone, such as those related to cable or satellite television service or other digital services. It is often a technical challenge to communicate the information needed to a large number of customers given limited resources, especially when a common problem affects a vast number of customers at the same time or within a specific timeframe. This technical problem may be solved or alleviated by automatically playing on the receiving device of the customer (e.g., DVR 151) a helpful message, video and/or advertisement upon detection by the receiving device and/or MMD system 110 of such a condition for contacting the user. This may especially be helpful to do while the user is online (e.g., on the phone or in a chat session) with a customer service representative such that the customer service representative can walk through with the customer the message, video and/or advertisement while it is being displayed.

For example, as shown in FIG. 6, the DVR 151 and/or MMD system 110 has detected an event or condition X (e.g., a problem with the DVR 151 or service to the DVR). In response, the DVR 151 plays media asset 602 on display 156, which may be a customer service message and/or video regarding the detected event or condition X, such as how to resolve or address the detected event or condition X. Also shown are two example interactive and selectable graphical user interface elements (e.g., buttons or links). The user may select element 604 to display or access further information regarding the detected event or condition X. For example, such further information may be displayed on display 156 and/or information sent or displayed on another device associated with the user (e.g., a mobile device) in response to selection of element 604. The user may select element 606 to dismiss the message included in displayed media asset 602 to return to the previous program or screen. Additional or different selectable elements may be provided in various embodiments.

Various conditions for contacting the user and/or detected events or conditions may include, but are not limited to, those regarding: a delinquent account of the user for data or content service associated with the receiving device (and the media asset 602 includes a message regarding addressing the delinquency of the account to avoid a service interruption; a status of an account of the user for data or content service associated with the receiving device (and the media asset 602 includes a video message regarding a loyalty reward for the user due to the status of the account); a status of the receiving device or an account of the user for cable or satellite broadcast television service associated with the receiving device that indicates the receiving device is not connected via the Internet for additional services (and the media asset 602 includes a video message regarding benefits of the receiving device being connected via the Internet for additional services); whether one or more of: a maximum frequency threshold of playing the media asset stored on the receiving device has been reached and the media asset stored on the receiving device has been played a maximum total number of times; and selection of a recorded program stored on the receiving device for playing from a beginning of the recorded program.

Those skilled in the art will appreciate that the various operations depicted via FIG. 6, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 7:
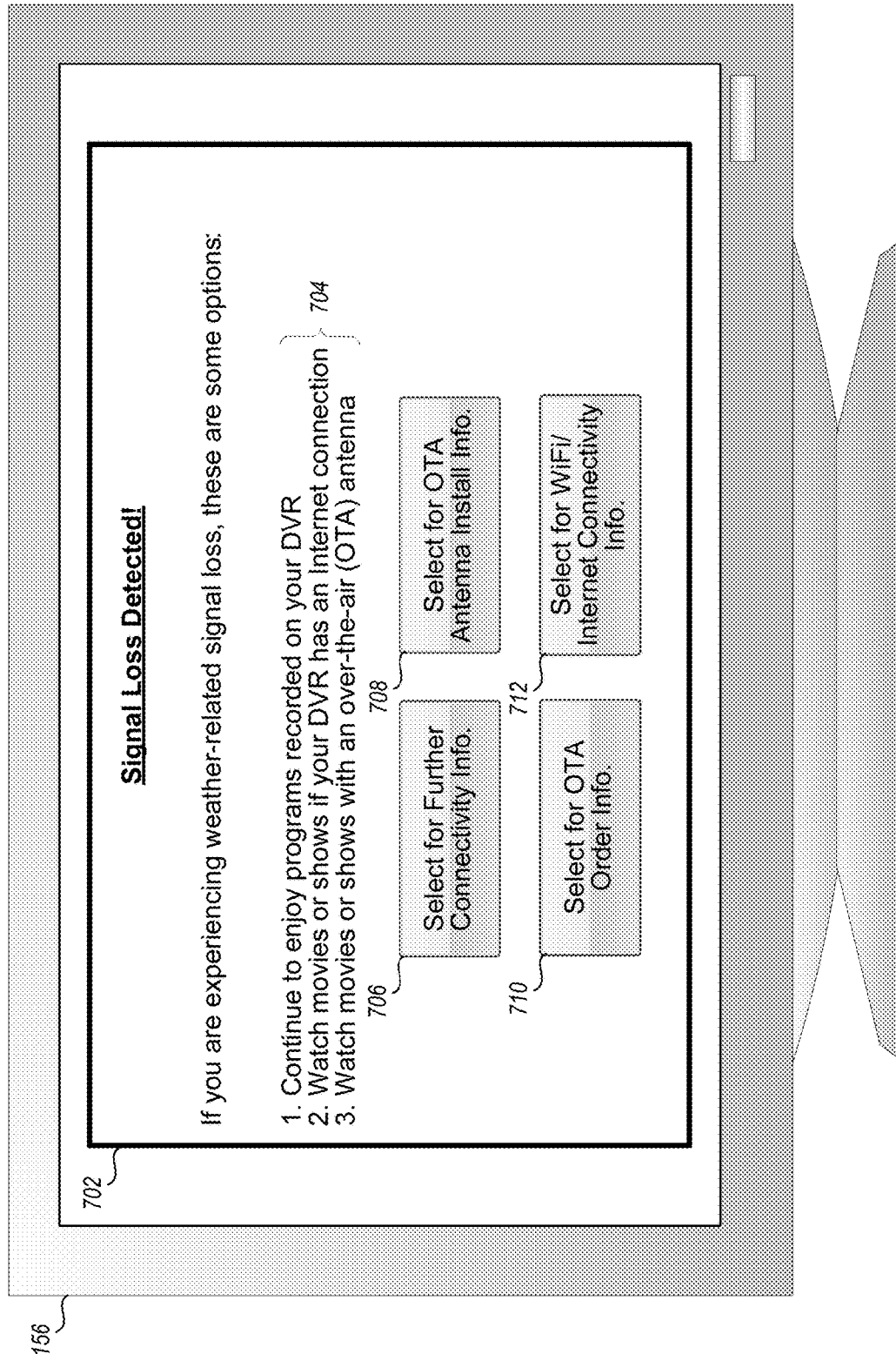
FIG. 7 is an elevational view of an example display of a receiving device displaying an example message stored on the receiving device being played by the receiving device upon a detected signal loss event or condition, according to various embodiments described herein.

FIG. 7 is an elevational view of an example display 156 of a receiving device (e.g., DVR 151) displaying an example message stored on the receiving device being played by the receiving device upon a detected signal loss event or condition, according to various embodiments described herein.

As one example, the DVR 151 and/or MMD system 110 has detected a television broadcast signal loss and DVR 151 displays a media asset 702 including a message regarding the signal loss. For satellite service, this is often due to weather conditions in the particular area of the user. In an example embodiment, in response to receiving an indication regarding the television broadcast signal loss, the DVR 151 may identify a media asset 702 stored on DVR 151 via media asset metadata 164 stored on DVR 151 associating the indication regarding the television broadcast signal loss with the media asset 702 stored on the receiving device. The DVR 151 then determines to automatically play the media asset 702 stored on the DVR 151 as (or in conjunction with) a customer service message to the user based on the identification of the media asset 702 stored on the DVR 151. In the illustrated example, the media asset 702 includes options 704 (which may be selectable) for the user to continue to enjoy viewing content, such as watching programs recorded on DVR 151, watching movies or shows via the Internet if the DVR 151 is connected accordingly (e.g., via network(s) 101), and watching movies or shows with an over-the-air (OTA) antenna.

Also shown are four example interactive and selectable graphical user interface elements (e.g., buttons or links) to access additional relevant content or information. The user may select element 706 to receive further connectivity information; select element 708 to receive information on how to install an OTA antenna; select element 710 to order (or for information on how to order) an OTA antenna; and select element 712 for information on WiFi and/or Internet connectivity for the DVR 151. Additional or different selectable elements may be provided in various embodiments.

Figure 8A:
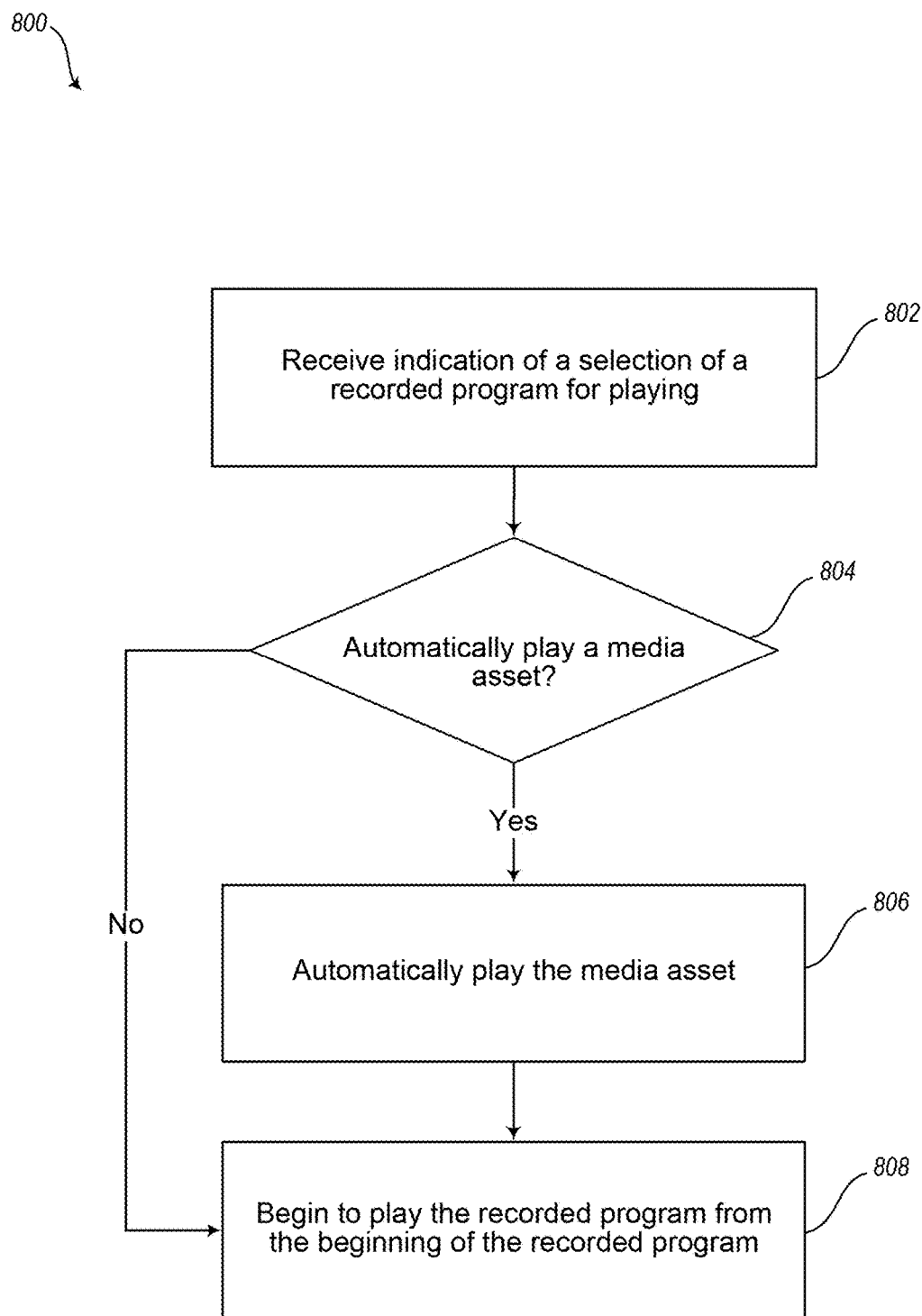
FIG. 8A is a flowchart illustrating a method for automatically playing a media asset in response to receiving an indication of a selection of a recorded program for playing, according to various embodiments described herein.

FIG. 8A is a flowchart illustrating a method 800 for automatically playing a media asset in response to receiving an indication of a selection of a recorded program for playing, according to various embodiments described herein.

At 802, the DVR 151 receives an indication of a selection of a recorded program stored on the DVR 151 for playing from a beginning of the recorded program.

At 804, in response to the receiving of the indication of the selection of the recorded program for playing, the DVR 151 determines whether to automatically play a media asset before playing the recorded program from the beginning of the recorded program.

If the DVR 151 determines to automatically play a media asset before playing the recorded program from the beginning of the recorded program, then the process proceeds to 806. If the DVR 151 determines to not automatically play a media asset before playing the recorded program from the beginning of the recorded program, then the process proceeds to 808.

At 806, in response to receiving the indication of the selection of the recorded program for playing, the DVR 151 automatically plays the media asset (or at least a portion of the media asset) before playing the recorded program from the beginning of the recorded program. For example, this may be in response to reading a cue stored on the DVR 151 and associated with the recorded program or one or more services of the DVR associated with playing the recorded program. In one embodiment, the cue has been set or modified to have a presentation time stamp set to correspond to a beginning of the recorded program, causing the media asset to play immediately before playing the recorded program from the beginning of the recorded program.

At 808, the DVR begins to play the recorded program from the beginning of the recorded program.

Figure 8B:
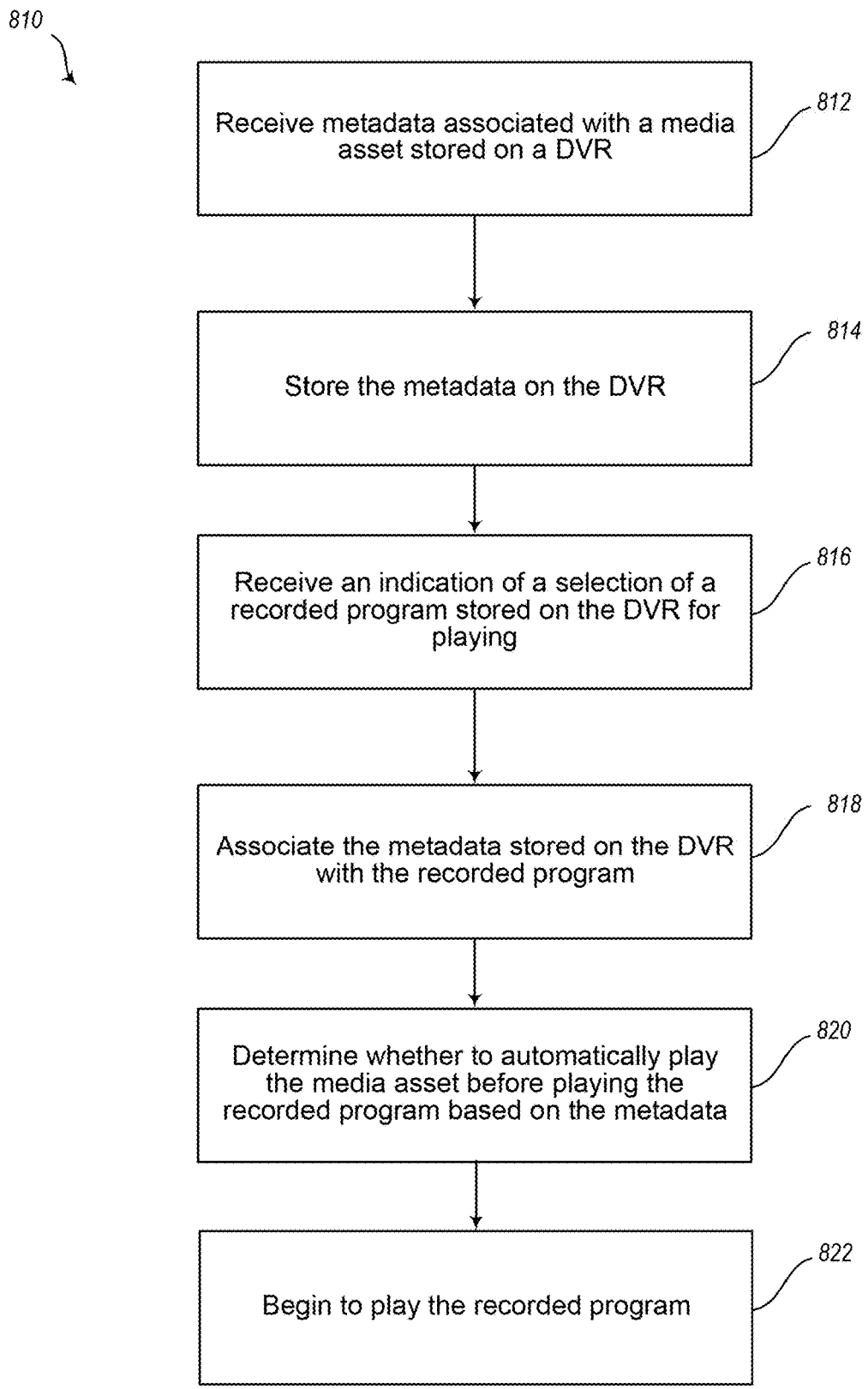
FIG. 8B is a flowchart illustrating a method for determining whether to automatically play a media asset stored on a DVR before playing a recorded program, according to various embodiments described herein.

FIG. 8B is a flowchart illustrating a method 810 for determining whether to automatically play a media asset stored on a DVR before playing a recorded program, according to various embodiments described herein.

At 812, previous to a recorded program being recorded on the DVR 151, the DVR 151 receives, from a multichannel media distribution system, metadata associated with a media asset stored or to be stored on the DVR 151.

At 814, the DVR 151 stores the metadata on the DVR.

At 816, the DVR 151 receives an indication of a selection of the recorded program stored on the DVR for playing from a beginning of the recorded program.

At 808, the DVR 151 associates the metadata stored on the DVR with the recorded program.

At 820, in response to receiving the indication of the selection of the recorded program for playing, the DVR 151 determines whether to automatically play the media asset before playing the recorded program from the beginning of the recorded program based on the metadata associated with the recorded program.

At 822 the DVR begins to play the recorded program from the beginning of the recorded program. For example, the DVR may automatically play the media asset immediately before playing the recorded program from the beginning of the recorded program. In some embodiments, the DVR 151 may select the media asset for playing from a plurality of media assets. This selection of the media asset for playing may be triggered by receiving the indication of the selection of the recorded program for playing, which triggers the subsequent determination of whether to automatically play a media asset before playing the recorded program.

Figure 9:
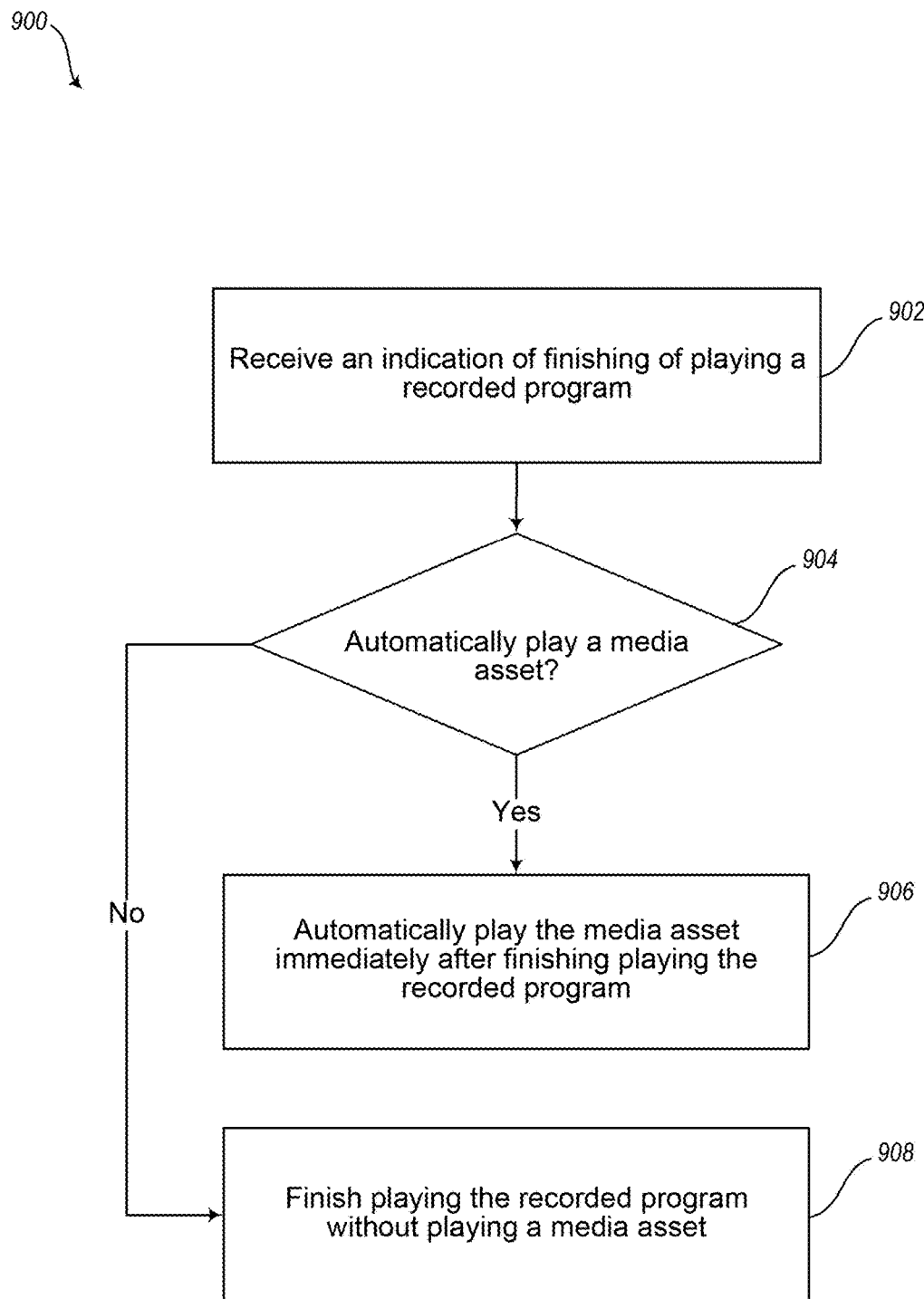
FIG. 9 is a flowchart illustrating a method for automatically playing a media asset in response to finishing playing of a recorded program, according to various embodiments described herein.

FIG. 9 is a flowchart illustrating a method 900 for automatically playing a media asset in response to finishing of playing a recorded program, according to various embodiments described herein.

At 902, the DVR 151 receives an indication of finishing of playing a recorded program stored on the DVR 151.

At 904, in response to the receiving of the indication of finishing of playing the recorded program stored on the DVR 151, the DVR 151 determines whether to automatically play a media asset immediately after finishing playing the recorded program.

If the DVR 151 determines to automatically play a media asset immediately after finishing playing the recorded program, then the process proceeds to 906. If the DVR 151 determines to not automatically play a media asset immediately after finishing playing the recorded program, then the process proceeds to 908.

At 906, the DVR 151 automatically plays the media asset after finishing playing the recorded program. For example, this may be in response to reading a cue stored on the DVR 151 and associated with the recorded program or one or more services of the DVR associated with playing (or finishing of playing) the recorded program. In one embodiment, the cue has been set or modified to have a presentation time stamp set to correspond to an ending of the recorded program, causing the media asset to play immediately after finishing playing the recorded program.

At 908, the DVR 151 finishes playing the recorded program without automatically playing the media asset immediately after finishing playing the recorded program.

Figure 10:
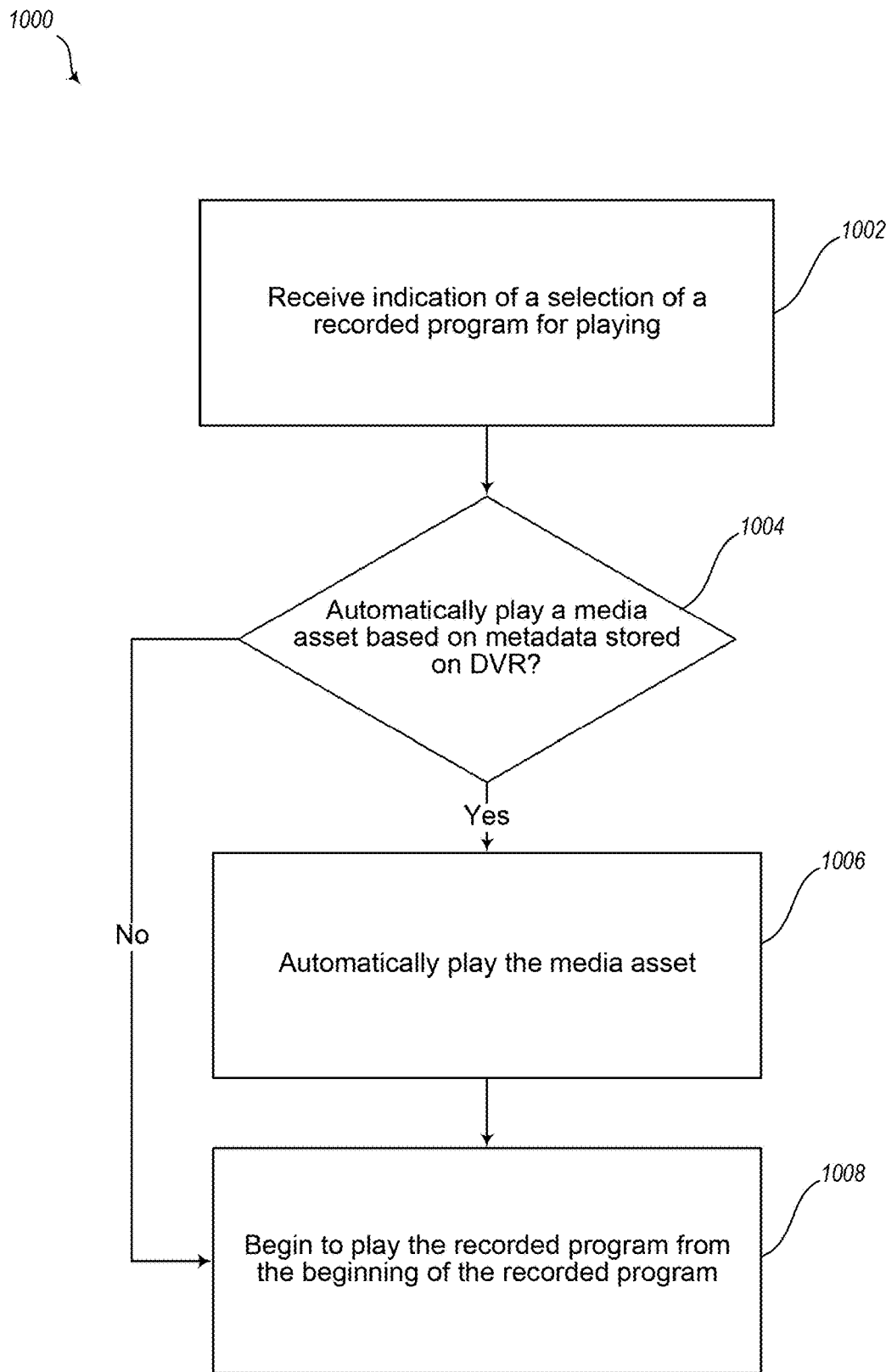
FIG. 10 is a flowchart illustrating a method for automatically playing a media asset based on metadata stored on a DVR in response to receiving an indication of a selection of a recorded program for playing, according to various embodiments described herein.

FIG. 10 is a flowchart illustrating a method 1000 for automatically playing a media asset based on metadata stored on a DVR in response to receiving an indication of a selection of a recorded program for playing, according to various embodiments described herein.

At 1002, the DVR 151 receives an indication of a selection of a recorded program stored on the DVR 151 for playing from a beginning of the recorded program.

At 1004, in response to receiving the indication of the selection of the recorded program for playing, the DVR 151 determines whether to automatically play a media asset before playing the recorded program from the beginning of the recorded program based on metadata, also stored on the DVR 151, associated with one or more of: the DVR, the media asset, the recorded program and one or more services of the DVR associated with playing the recorded program. For example, the DVR 151 may determine whether a cue included in the metadata stored on the DVR is associated with the media asset and the recorded program, such as via a common Service ID stored in the metadata). The DVR 151 may then determine whether to automatically play the media asset before playing the recorded program based on the determination of whether a cue in the metadata stored on the DVR 151 is associated with the media asset and the recorded program is stored on the DVR 151. The Service ID that identifies an addressable service of the DVR 151 that plays the recorded program is one of a plurality of Service IDs stored on the DVR 151. The plurality of Service IDs includes one or more other Service IDs that each identifies a different television broadcast channel received by the DVR 151 as an addressable service.

If the DVR 151, based on metadata, determines to automatically play a media asset before playing the recorded program from the beginning of the recorded program, then the process proceeds to 1006. If the DVR 151 determines to not automatically play a media asset before playing the recorded program from the beginning of the recorded program based on metadata, then the process proceeds to 1008.

At 1006, the DVR 151 automatically plays the media asset before playing the recorded program from the beginning of the recorded program. The DVR 151 may automatically playing the media asset in response to reading a cue stored in metadata on the DVR 151 and associated with the recorded program (e.g., via a common Service ID). The cue has a presentation time stamp (PTS) with respect to the recorded program set to zero, causing the media asset to play before beginning to play the recorded program.

At 1008, the DVR 151 begins to play the recorded program from the beginning of the recorded program.

Figure 11:
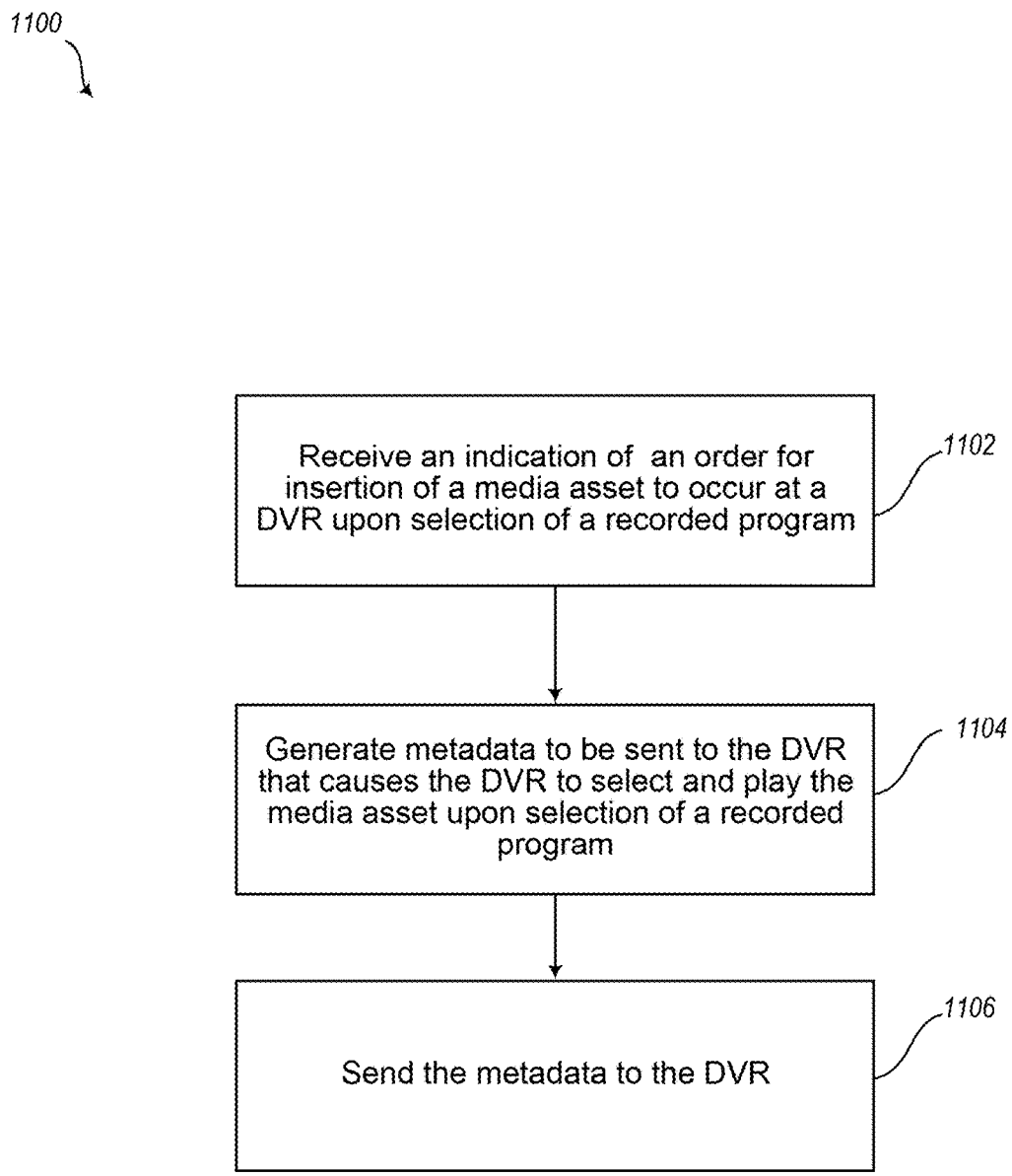
FIG. 11 is a flowchart illustrating a method for sending metadata to a DVR to cause the DVR to select and play a media asset upon selection of a recorded program for playing, according to various embodiments described herein.

FIG. 11 is a flowchart illustrating a method 1100 for sending metadata to a DVR to cause the DVR to select and play a media asset upon selection of a recorded program for playing, according to various embodiments described herein.

At 1102, the multichannel media distribution (MMD) system 110 or media programming broker service (MPBS) 190 receives an indication of an order for insertion of a media asset. The order is for insertion of the media asset to occur at a DVR or group of DVRs (e.g., including DVR 151) upon selection of a recorded program stored on any of the DVR or group of DVRs for playing from a beginning of the recorded program.

At 1104, the MMD system 110 or MPBS 190 generates metadata to be sent to the DVR or group of DVRs that causes the DVR or group of DVRs to select and play the media asset stored on the DVR or group of DVRs based on the metadata upon selection of a recorded program stored on the DVR or group of DVRs.

At 1106 the MMD system 110 or MPBS 190 sends the metadata (or causes the metadata to be sent) to the DVR or group of DVRs.

Figure 12:
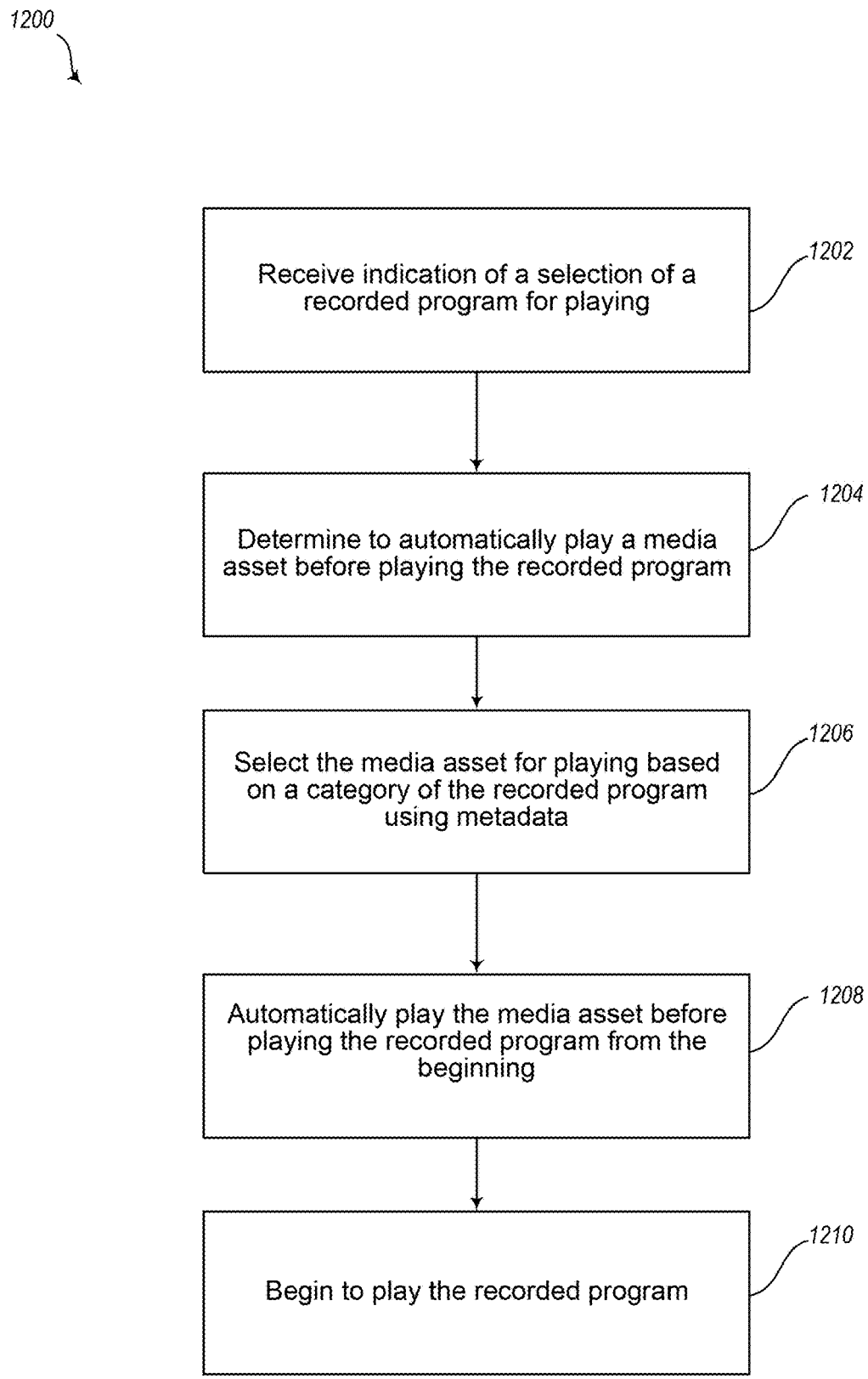
FIG. 12 is a flowchart illustrating a method for selecting the media asset on the DVR for playing based on a category of the selected recorded program using metadata, according to various embodiments described herein.

FIG. 12 is a flowchart illustrating a method 1200 for selecting a media asset on a DVR for playing based on a category of the selected recorded program using metadata, according to various embodiments described herein.

At 1202, the DVR 151 receives an indication of a selection of a recorded program stored on the DVR 151 for playing from a beginning of the recorded program.

At 1204, in response to the receiving of the indication of the selection of the recorded program for playing, the DVR 151 determines to automatically play a media asset before playing the recorded program from the beginning of the recorded program.

At 1206, before beginning to play the recorded program, the DVR 151 selects the media asset for playing based on a category of the recorded program using metadata, also stored on the DVR 151, associated with one or more of: the DVR, the media asset, the recorded program, and one or more services of the DVR associated with playing the recorded program.

At 1208, the DVR 151 automatically plays the media asset selected for playing based on a category of the recorded program before playing the recorded program from the beginning of the recorded program.

At 1210, the DVR 151 begins to play the recorded program from the beginning of the recorded program.

Figure 13:
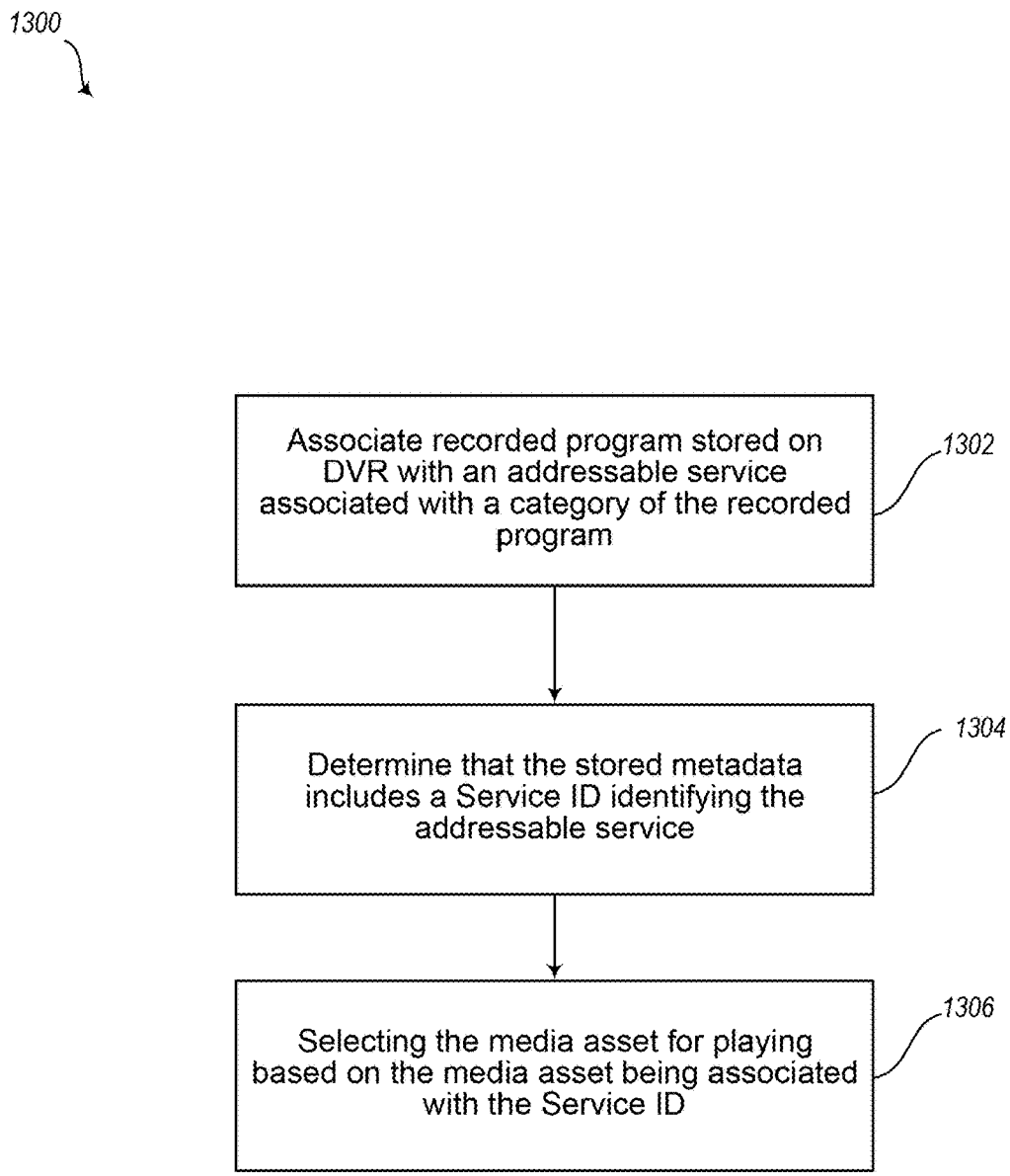
FIG. 13 is a flowchart illustrating a method for selecting the media asset on the DVR for playing using metadata useful in the method of FIG. 12, according to various embodiments described herein.

FIG. 13 is a flowchart illustrating a method 1300 for selecting the media asset on the DVR for playing using metadata useful in the method of FIG. 12, according to various embodiments described herein.

At 1302, the DVR 151 associates the recorded program stored on the DVR 151 with an addressable service associated with the category of the recorded program.

At 1304, the DVR 151 determines that the stored metadata includes a service identifier (Service ID) identifying the addressable service associated with the recorded program stored on the DVR 151, wherein the category of the recorded program is associated with the Service ID. For example, the Service ID identifying the addressable service may be one of a plurality of Service IDs stored on the DVR 151. The plurality of Service IDs includes one or more other Service IDs that each identifies a different television broadcast channel received by the DVR as an addressable service. The DVR 151 may also use media asset metadata with Service IDs corresponding to the different television broadcast channels for media asset (e.g., advertisement) insertion into the different television broadcast channels based on the media asset metadata Service IDs identifying those different television broadcast channels.

At 1306, the DVR 151 selects the media asset for playing from a plurality of media assets stored on the DVR 151 based on the media asset being associated with the Service ID associated with the category of the recorded program.

Figure 14:
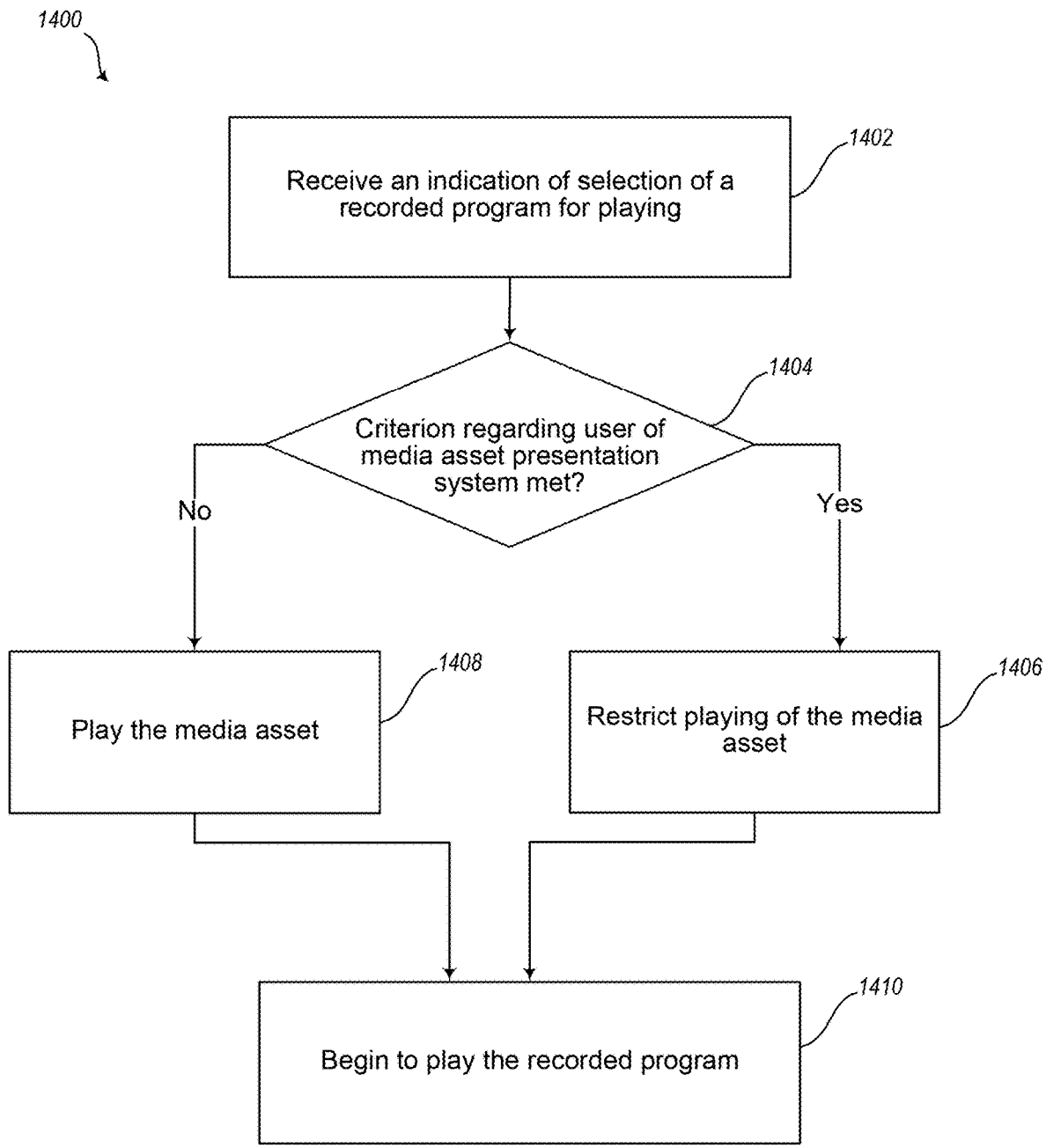
FIG. 14 is a flowchart illustrating a method for restricting playing of a media asset based on criterion regarding a user, according to various embodiments described herein.

FIG. 14 is a flowchart illustrating a method 1400 for restricting playing of a media asset based on criterion regarding a user, according to various embodiments described herein.

At 1402, the DVR 151 receives an indication of a selection of a recorded program stored on the DVR 151 for playing from a beginning of the recorded program.

At 1404, the DVR 151 determines whether a criterion regarding a user of the media asset presentation system has been met.

If the DVR 151 determines whether that the criterion regarding a user of the media asset presentation system has been met, the process proceeds to 1406. If the DVR 151 determines whether that the criterion regarding a user of the media asset presentation system has not been met, the process proceeds to 1408. For example, the determination whether the criterion regarding the user of the media asset presentation system has been met may include determining whether the user has voted in a particular election.

At 1406, the DVR 151 determines to restrict playing of the media asset before playing the recorded program from the beginning of the recorded program based on the determination that the criterion regarding the user of the media asset presentation system has been met. For example, the determination to restrict playing of the media asset may include determining to restrict playing of a political advertisement related to the particular election based on a determination that the user has voted in the particular election and that the political advertisement is related to the particular election.

At 1408, the DVR 151 determines to play the media asset before playing the recorded program from the beginning of the recorded program based on the determination that the criterion regarding the user of the media asset presentation system has not been met.

At 1410, the DVR 151 begins to play the recorded program from the beginning of the recorded program.

Figure 15:
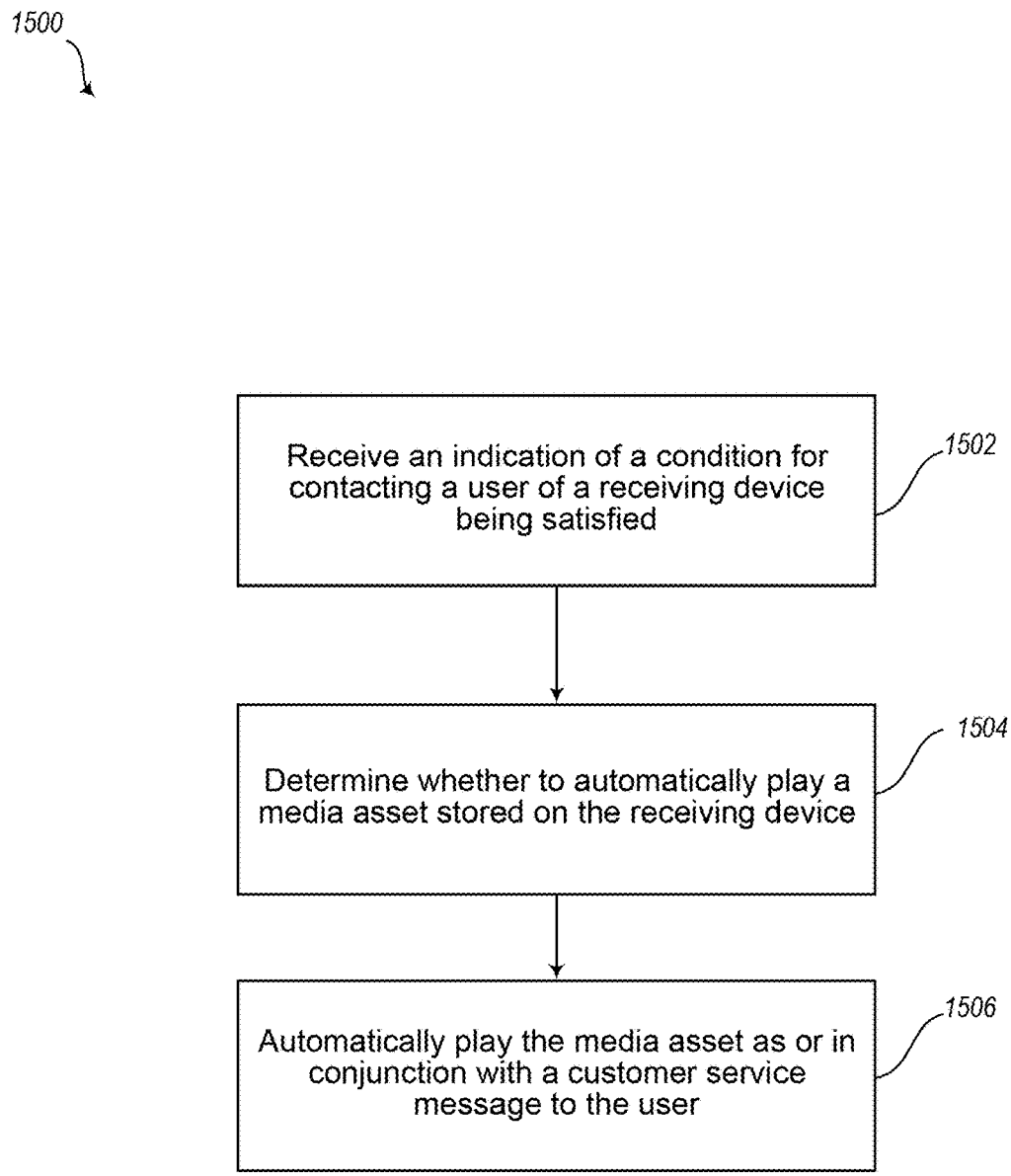
FIG. 15 is a flowchart illustrating a method for automatically playing a media asset as or in conjunction with a customer service message to the user, according to various embodiments described herein.

FIG. 15 is a flowchart illustrating a method 1500 for automatically playing a media asset as or in conjunction with a customer service message to the user, according to various embodiments described herein.

At 1502, the DVR 151 receives an indication of a condition for contacting a user of a receiving device (e.g., DVR 151) being satisfied.

At 1504, in response to the receiving of the indication of the condition for contacting the user of the receiving device being satisfied, the receiving device determines whether to automatically play a media asset stored on the receiving device as or in conjunction with a customer service message to the user. For example, the receiving device may determine whether to automatically play the media asset stored on the receiving device is based on metadata stored on the receiving device associating the condition for contacting the user with the media asset stored on the receiving device. In response to receiving the indication regarding the television broadcast signal loss, the receiving device may identify the media asset stored on the receiving device via metadata stored on the receiving device associating the condition for contacting the user with the media asset stored on the receiving device. The receiving device may determine to automatically play the media asset stored on the receiving device as or in conjunction with a customer service message to the user based on the identification of the media asset stored on the receiving device via the metadata. According to one embodiment, this may be accomplished by the metadata stored on the receiving device associating the condition for contacting the user with the media asset stored on the receiving device including a service identifier (Service ID) associated with the condition for contacting the user and the media asset. The media asset stored on the receiving device may be identified or selected via the Service ID associated with the condition for contacting the user.

At 1506, the receiving device automatically plays the media asset as or in conjunction with a customer service message to the user based on the determination. In one embodiment, the condition for contacting the user includes a status of the receiving device or an account of the user for cable or satellite broadcast television service associated with the receiving device that indicates the receiving device is not connected via the Internet for additional services. In this case, the media asset may include a video message regarding benefits of the receiving device being connected via the Internet for additional services.

In some embodiments, the receiving device may limit playing of the customer service message such that it is played a maximum number of times in a given time period. For example, the condition for contacting the user may be regarding whether one or more of: a maximum frequency threshold of playing the media asset stored on the receiving device has been reached and the media asset stored on the receiving device has been played a maximum total number of times. In some embodiments, the condition for contacting the user is selection of a recorded program stored on the receiving device for playing from a beginning of the recorded program.

Figure 16:
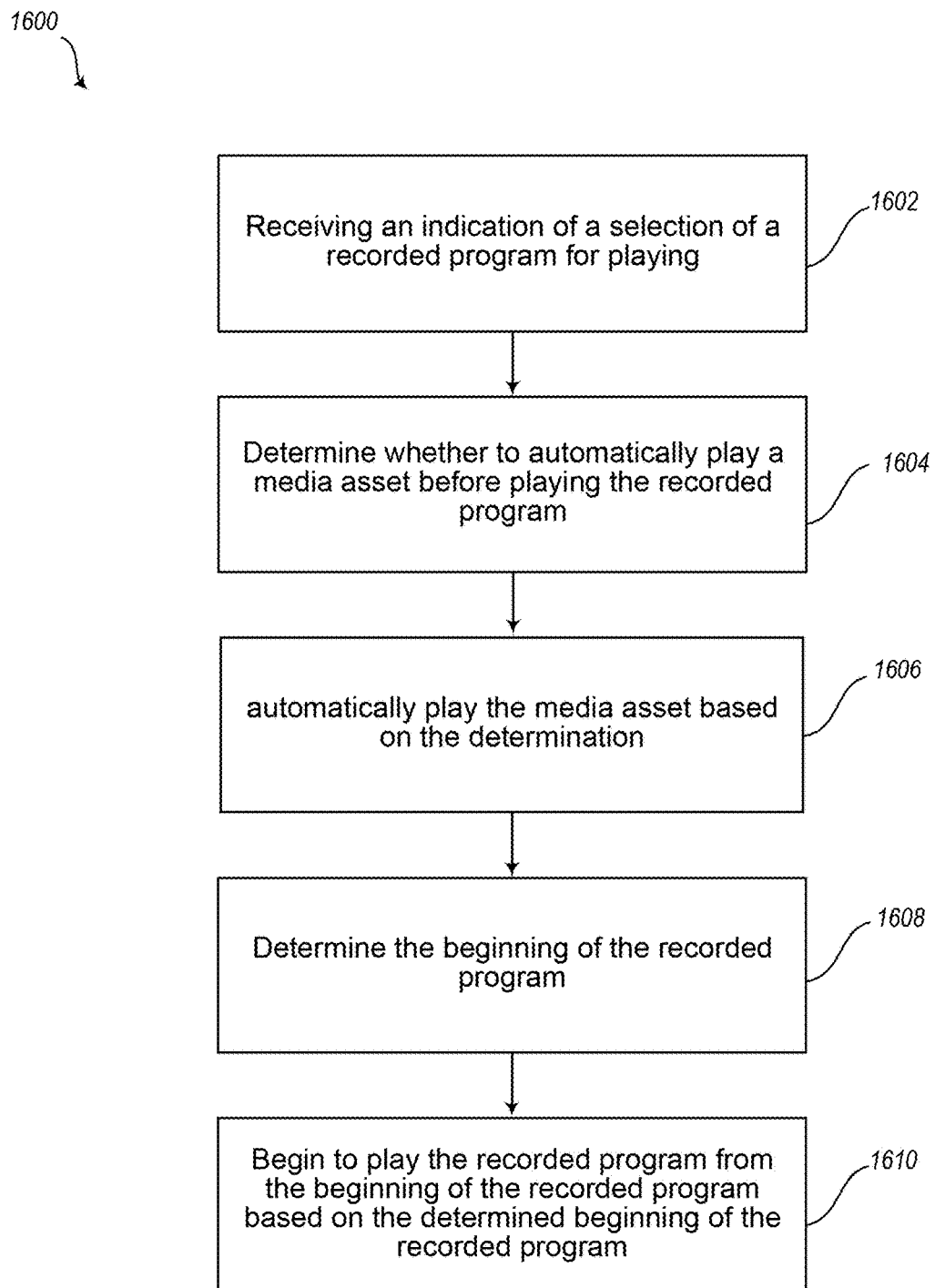
FIG. 16 is a flowchart illustrating a method for automatically playing a media asset from the beginning of a recorded program, according to various embodiments described herein.

FIG. 16 is a flowchart illustrating a method 1600 for automatically playing a media asset from the beginning of a recorded program, according to various embodiments described herein.

At 1602, the DVR 151 receives an indication of a selection of a recorded program stored on the DVR 151 for playing from a beginning of the recorded program.

At 1604, in response to the receiving of the indication of the selection of the recorded program for playing, the DVR 151 determines whether to automatically play a media asset before playing the recorded program from the beginning of the recorded program.

At 1606, based on the determination of whether to automatically play the media asset before playing the recorded program, the DVR 151 automatically plays the media asset before playing the recorded program from the beginning of the recorded program.

At 1608 the DVR 151 determines the beginning of the recorded program from a media file of recorded content including the recorded program and content other than the recorded program before the beginning of the recorded program.

At 1610, the DVR 151 begins to play the recorded program from the beginning of the recorded program based on the determined beginning of the recorded program.

Figure 17:
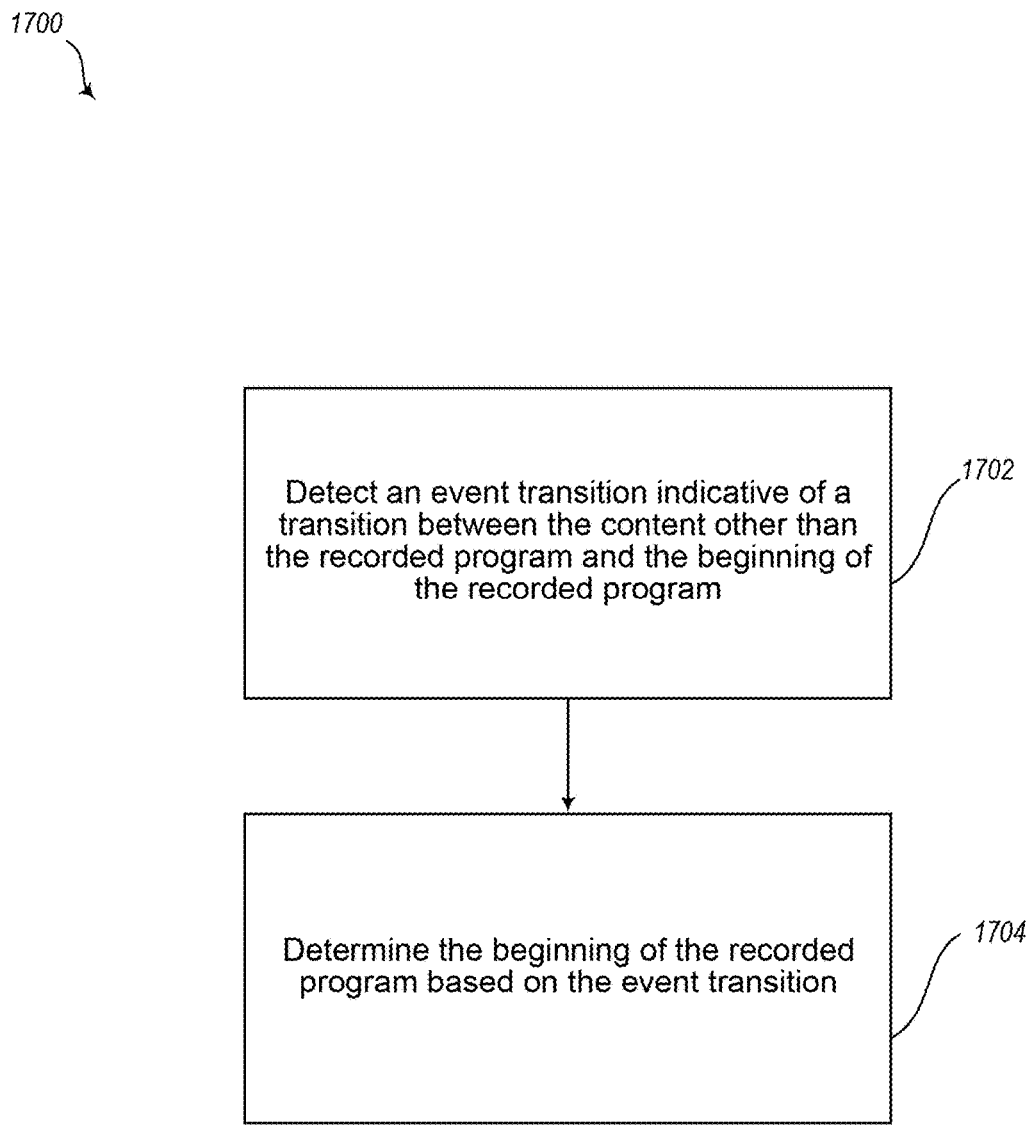
FIG. 17 is a flowchart illustrating a method for determining the beginning of the recorded program based on an event transition useful in the method of FIG. 16, according to various embodiments described herein.

FIG. 17 is a flowchart illustrating a method 1700 for determining the beginning of the recorded program based on an event transition useful in the method of FIG. 16, according to various embodiments described herein.

At 1702, the DVR 151 detects an event transition indicative of a transition between the content other than the recorded program and the beginning of the recorded program.

At 1704, the DVR 151 determines the beginning of the recorded program based on the event transition. In one embodiment, before beginning to play the recorded program from the beginning of the recorded program, the DVR 151 sets a timestamp marker indicating where the beginning of the recorded program is within the media file based on the detected event transition such that the media file begins to play at the timestamp marker. For example, the DVR 151 may automatically play the media asset in response to reading a cue stored in metadata on the DVR and associated with the recorded program. The cue may have a presentation time stamp (PTS) with respect to the recorded program set to the timestamp marker indicating where the beginning of the recorded program is, causing the media asset to play before beginning to play the recorded program.

In another embodiment, before beginning to play the recorded program from the beginning of the recorded program, the DVR 151 trims the media file to cut from the media file the other content other than the recorded program at a point corresponding to the detected event transition indicative of the transition between the content other than the recorded program and the beginning of the recorded program. This is such that beginning to play the recorded program causes the media file to play without playing the content other than the recorded program before the beginning of the recorded program.

Figure 18:
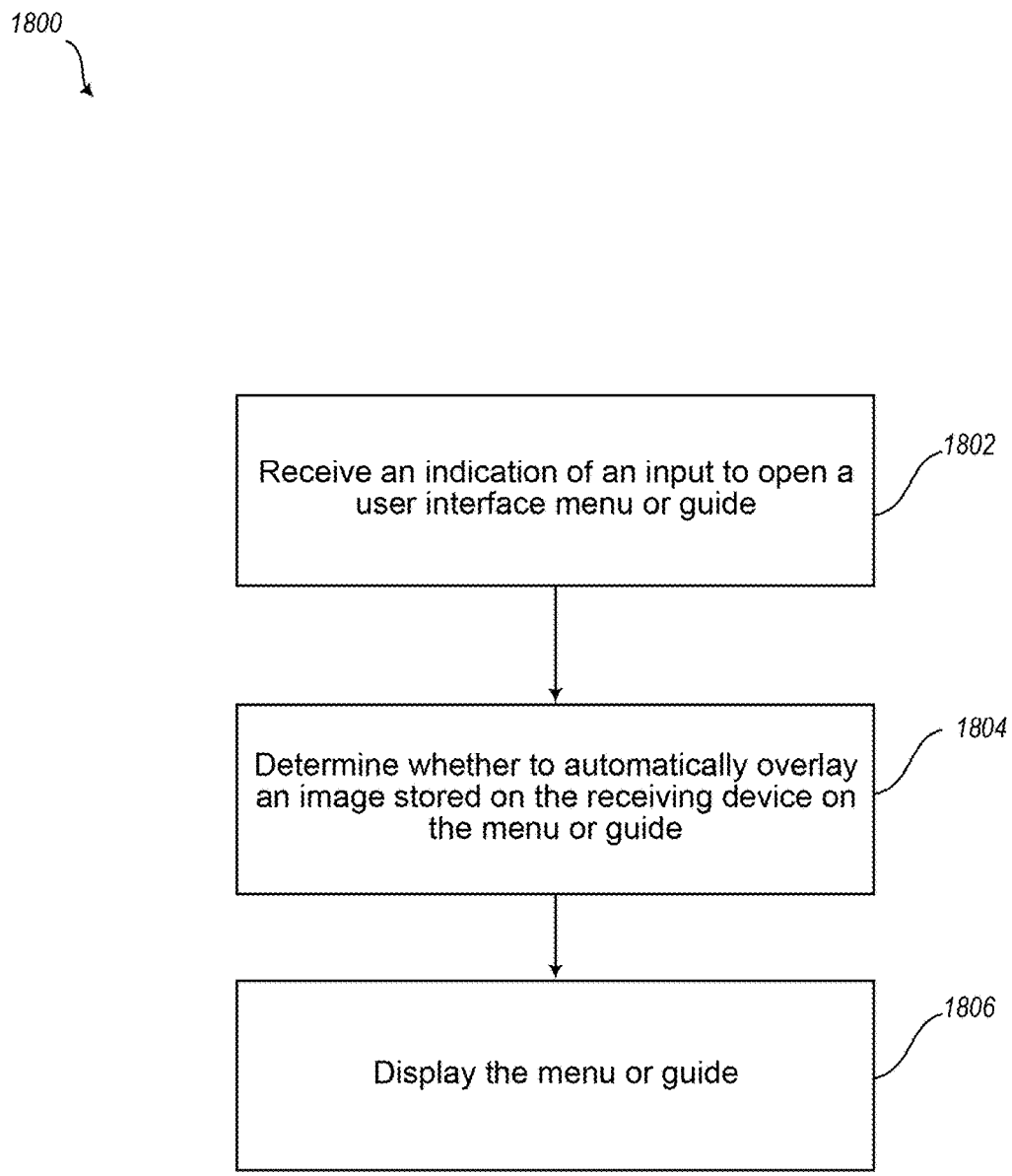
FIG. 18 is a flowchart illustrating a method for determining whether to automatically overlay an image on a menu or guide, according to various embodiments described herein.

FIG. 18 is a flowchart illustrating a method 1800 for determining whether to automatically overlay an image on a menu or guide, according to various embodiments described herein.

At 1802, a receiving device (e.g., DVR 151) receives an indication of an input to open a user interface menu or guide via the receiving device.

At 1804, in response to the receiving of input to open a user interface menu or guide, the receiving device determines whether to automatically overlay an image stored on the receiving device on the menu or guide. For example, this determination may be based on metadata stored on the receiving device associating the menu or guide with the image stored on the receiving device. In one embodiment, the metadata stored on the receiving device associating the menu or guide with the image stored on the receiving device includes a service identifier (Service ID) that identifies the menu or guide and that is associated with the image to be overlaid on the menu or guide. The Service ID identifying the menu or guide may be one of a plurality of Service IDs stored on the receiving device in which the plurality of Service IDs also includes one or more other Service IDs that each identifies a different television broadcast channel received by the receiving device as an addressable service. The receiving device may identify the image stored on the receiving device via the Service ID that identifies the menu or guide.

At 1806, the receiving device displays (or causes display of) the menu or guide in response to the indication of the input to open the user interface menu or guide. The receiving device automatically overlays the image stored on the receiving device on the menu or guide in response to the determination of whether to automatically overlay the image stored on the receiving device on the menu or guide.

The receiving device may select the image stored on the receiving device from a plurality of images stored on the receiving device using metadata, also stored on the receiving device, associated with the menu of guide. In one embodiment, the metadata stored on the receiving device includes a service identifier (Service ID) that identifies the menu or guide as an addressable service and the selection of the image is based on the Service ID. The selection of the image may include determining a characteristic of the menu or guide and selecting the image based on a correlation of the image to the characteristic of the menu or guide. For example, the menu or guide may an electronic program guide (EPG) and the characteristic may be a type of television programming currently displayed on a screen for selection within the EPG. The image stored on the receiving device may include an advertisement and the selection of the image based on a correlation of the image to the characteristic of the menu or guide may include selecting the advertisement based on a correlation of the advertisement to the type of television programming currently displayed on a screen for selection within the EPG.

Figure 19:
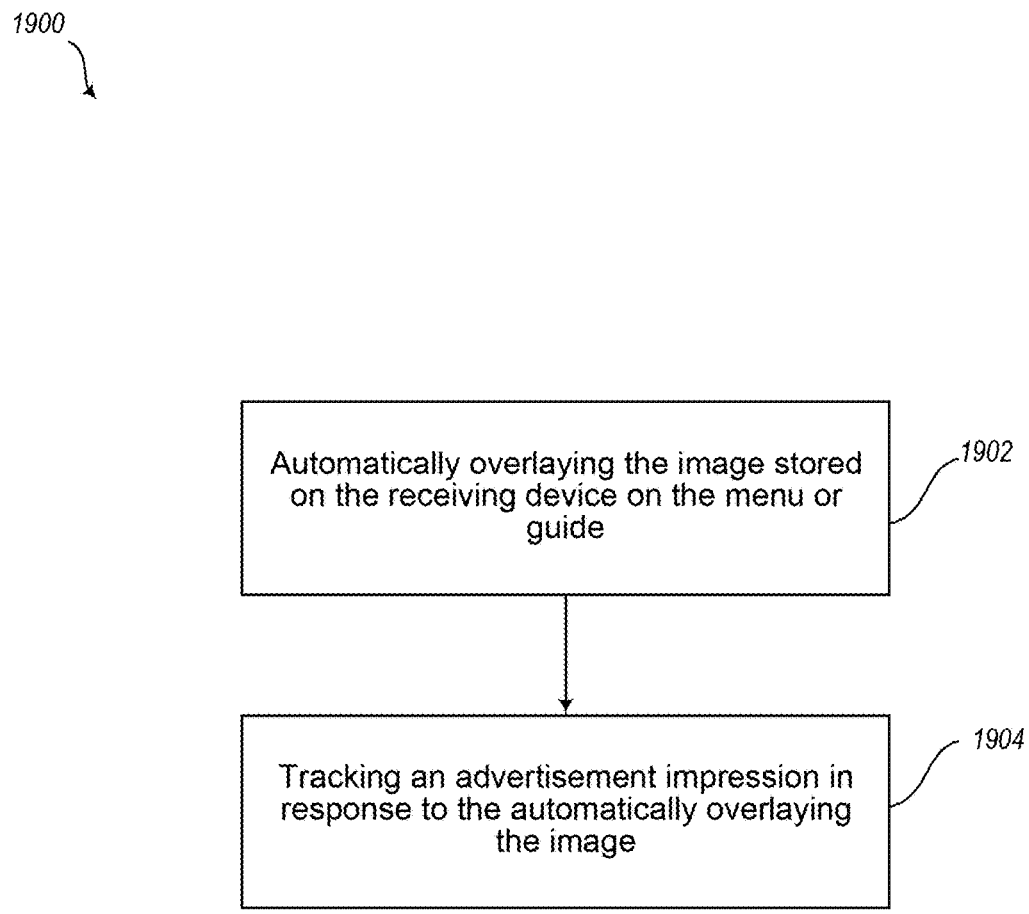
FIG. 19 is a flowchart illustrating a method, useful in the method of FIG. 18, for tracking an advertisement impression in response to automatically overlaying the image, according to various embodiments described herein.

FIG. 19 is a flowchart illustrating a method 1900, useful in the method of FIG. 18, for tracking an advertisement impression in response to automatically overlaying the image, according to various embodiments described herein.

At 1902, a receiving device (e.g., DVR 151) automatically overlays the image stored on the receiving device on the menu or guide in response to the determination of whether to automatically overlay the image stored on the receiving device on the menu or guide.

At 1904, the receiving device tracks an advertisement impression in response to the automatically overlaying of the image stored on the receiving device on the menu or guide. For example, an indication of the advertisement impression may be sent from the receiving device (e.g., DVR 151) to the MMD system 110, the MPBS 190, and/or the MADSP 180 for substantive analysis and accountability, to derive qualitative information, and for calculation of various performance metrics for overlaying such images stored on the receiving device on the menu or guide. In various example embodiments, the menu or guide is a menu or guide for configuring operational settings of the receiving device, a menu or guide for controlling the receiving device, or an electronic program guide.

Figure 20:
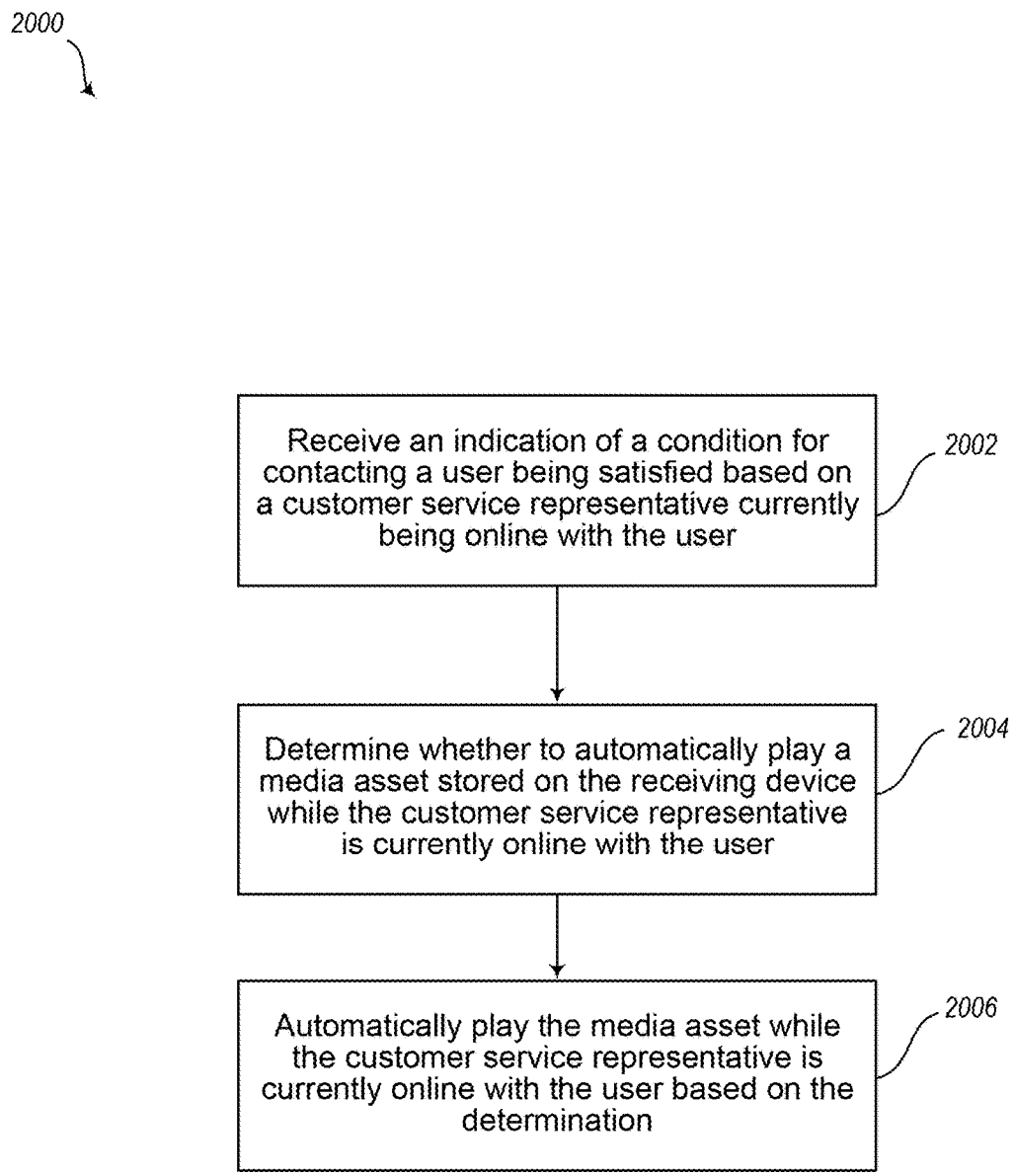
FIG. 20 is a flowchart illustrating a method for automatically playing a media asset while a customer service representative is currently online with a user, according to various embodiments described herein.

FIG. 20 is a flowchart illustrating a method 2000 for automatically playing a media asset while a customer service representative is currently online with a user, according to various embodiments described herein.

At 2002, a receiving device (e.g., DVR 151) receives an indication of a condition for contacting a user of the receiving device being satisfied based on a customer service representative currently being online with the user. For example, the customer service representative may be on a phone call with the user and/or the customer service representative may be in an online video or text chat session with the user. The condition for contacting the user may be the user having a technical support issue with the receiving device or service to the receiving device. In one embodiment, the media asset includes information helpful to resolving the technical support issue. As an additional example, the condition for contacting the user may be that a reason for the customer service call (or the reason that the customer service representative is currently online with the user) is related to services or programming available to the receiving device. In this case, the media asset may include advertisements related to the services or programming available to the receiving device. In another example embodiment, the condition for contacting the user includes receiving input from the customer service representative including a command to play the media asset while the customer service representative is currently online with the user.

At 2004, in response to the receiving of the indication of the condition for contacting the user of the receiving device being satisfied, the receiving device determines whether to automatically play a media asset stored on the receiving device while the customer service representative is currently online with the user. This determination may be based on metadata stored on the receiving device associating the condition for contacting the user with the media asset stored on the receiving device. For example, the metadata stored on the receiving device associating the condition for contacting the user with the media asset stored on the receiving device may include a service identifier (Service ID) associated with the condition for contacting the user and the media asset. The determination of whether to automatically play the media asset stored on the receiving device while the customer service representative is currently online with the user may be conditioned on whether a media asset stored on the receiving device is identified via the Service ID associated with the condition for contacting the user. The Service ID associated with the condition for contacting the user may be one of a plurality of Service IDs stored on the receiving device in which the plurality of Service IDs includes one or more other Service IDs that each identifies a different television broadcast channel received by the receiving device as an addressable service.

At 2006, the receiving device automatically plays the media asset while the customer service representative is currently online with the user based on the determination.

Figure 21:
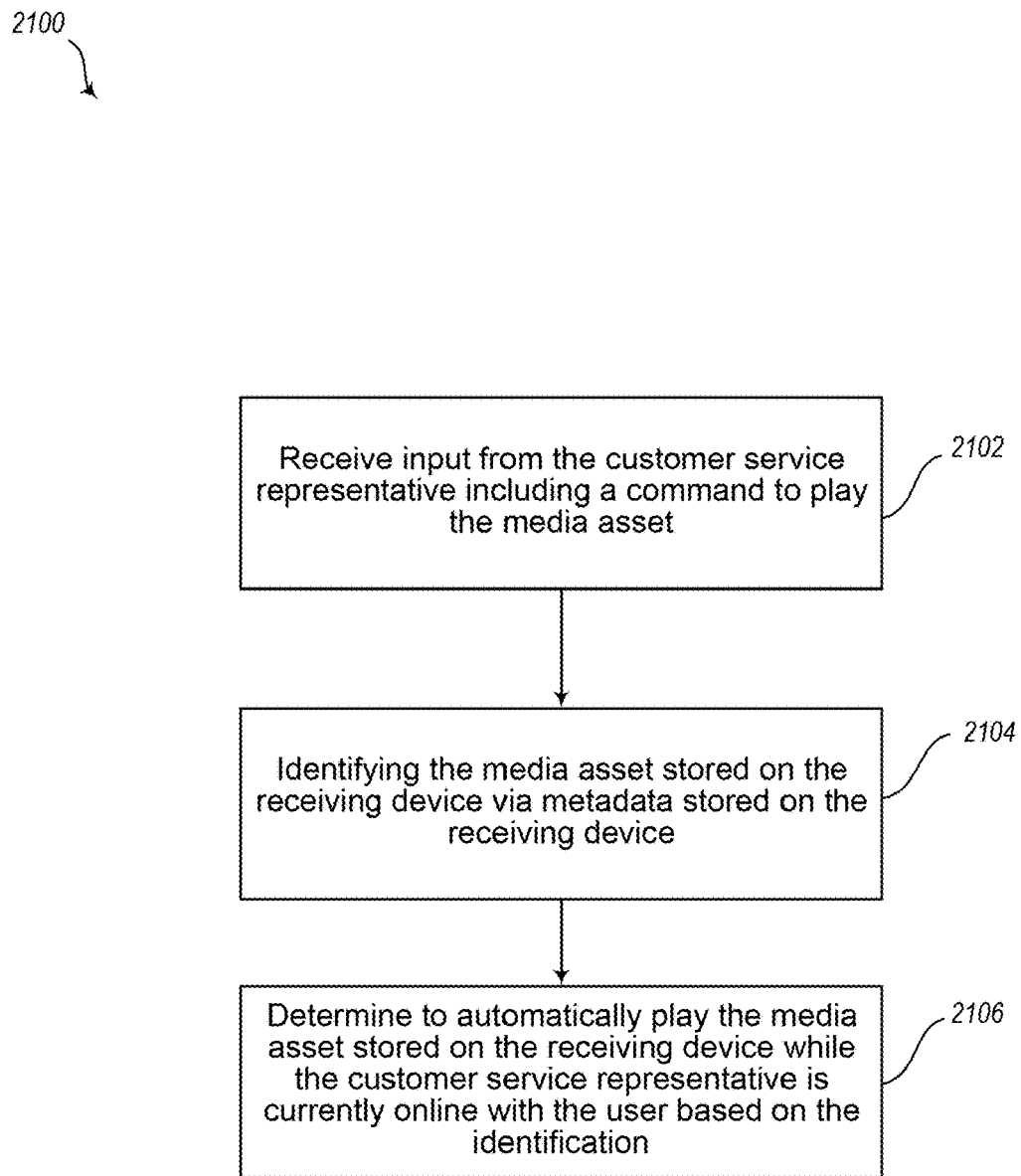
FIG. 21 is a flowchart illustrating a method for automatically playing a media asset while a customer service representative is currently online with a user, according to various embodiments described herein.

FIG. 21 is a flowchart illustrating a method 2100 for automatically playing a media asset while a customer service representative is currently online with a user, according to various embodiments described herein.

At 2102, the receiving device receives input from the customer service representative including a command to play the media asset while the customer service representative is currently online with the user;

At 2104, in response to receiving the input from the customer service representative including a command to play the media asset, the receiving device identifies the media asset stored on the receiving device via metadata stored on the receiving device associating the command to play the media asset with the media asset stored on the receiving device.

At 2106, the receiving device determines to automatically play the media asset stored on the receiving device while the customer service representative is currently online with the user based on the identification of the media asset stored on the receiving device via the metadata. In one embodiment, the media asset played while the customer service representative is currently online with the user may be a video with information on how to resolve a customer service issue related to the receiving device or service to the receiving device. The receiving device may also cause one or more interactive graphical user interface elements to be displayed that are selectable to access additional information to address the customer service issue. Such interactive graphical user interface elements may be displayed as part of or in conjunction with the video.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a media asset presentation system, the method comprising:

receiving, by one or more processors, an indication of a condition for contacting a user of a receiving device being satisfied;

in response to the receiving of the indication of the condition for contacting the user of the receiving device being satisfied, determining, by one or more processors, whether to automatically play, as or in conjunction with a customer service message to the user, a media asset stored on the receiving device, wherein the determining whether to automatically play the media asset stored on the receiving device is based on metadata stored on the receiving device associating the condition for contacting the user with the media asset stored on the receiving device, and wherein the metadata stored on the receiving device associating the condition for contacting the user with the media asset stored on the receiving device includes a service identifier (Service ID) associated with the condition for contacting the user and the media asset; and automatically playing, by one or more processors, the media asset as or in conjunction with a customer service message to the user based on the determination; wherein:

the receiving device comprises a television receiver;

the condition comprises a condition indicating a problem with the television receiver or service to the television receiver; and the media asset comprises the customer service message to the user such that the media asset provides guidance on how to resolve the problem with the television receiver or service to the television receiver;

the service ID indicates a channel of the television receiver on which to present the media asset;

the determining whether to automatically play the media asset includes identifying the media asset stored on the receiving device via the Service ID; and the receiving the indication of the condition for contacting the user of the receiving device being satisfied includes receiving an indication regarding a television broadcast signal loss to the receiving device.

2. The method of claim 1, wherein the media asset is a video indicating alternative uses of the receiving device in view of the signal loss.

3. The method of claim 2, further comprising:

causing, via the receiving device, one or more interactive graphical user interface elements to be displayed that are selectable to access additional information to address the signal loss.

4. The method of claim 3 wherein the one or more interactive graphical user interface elements are displayed as part of or in conjunction with the video indicating alternative uses of the receiving device in view of the signal loss.

5. The method of claim 3 wherein the one or more interactive graphical user interface elements are displayed as part of the customer service message to the user.

6. The method of claim 1 wherein the condition for contacting the user is regarding a delinquent account of the user for data or content service associated with the receiving device and the media asset includes a message regarding addressing the delinquency of the account to avoid a service interruption.

7. The method of claim 1 wherein the condition for contacting the user is regarding a status of an account of the user for data or content service associated with the receiving device and the media asset includes a video message regarding a loyalty reward for the user due to the status of the account.

8. The method of claim 1 wherein the condition for contacting the user includes a status of the receiving device or an account of the user for cable or satellite broadcast television service associated with the receiving device that indicates the receiving device is not connected via the Internet for additional services and the media asset includes a video message regarding benefits of the receiving device being connected via the Internet for additional services.

9. The method of claim 1 wherein the condition for contacting the user is regarding whether one or more of: a maximum frequency threshold of playing the media asset stored on the receiving device has been reached and the media asset stored on the receiving device has been played a maximum total number of times.

10. The method of claim 1 wherein the condition for contacting the user is selection of a recorded program stored on the receiving device for playing from a beginning of the recorded program.

11. A non-transitory computer-readable storage medium having computer-executable instructions stored thereon that, when executed by at least one processor, cause the following to be performed:

receiving, by one or more processors, an indication of a condition for contacting a user of a receiving device being satisfied;

in response to the receiving of the indication of the condition for contacting the user of the receiving device being satisfied, determining, by one or more processors, whether to automatically play, as or in conjunction with a customer service message to the user, a media asset stored on the receiving device, wherein the determining whether to automatically play the media asset stored on the receiving device is based on metadata stored on the receiving device associating the condition for contacting the user with the media asset stored on the receiving device, and wherein the metadata stored on the receiving device associating the condition for contacting the user with the media asset stored on the receiving device includes a service identifier (Service ID) associated with the condition for contacting the user and the media asset; and automatically playing, by one or more processors, the media asset as or in conjunction with a customer service message to the user based on the determination; wherein:

the receiving device comprises a television receiver;

the condition comprises a condition indicating a problem with the television receiver or service to the television receiver;

the media asset comprises the customer service message to the user such that the media asset provides guidance on how to resolve the problem with the television receiver or service to the television receiver;

the service ID indicates a channel of the television receiver on which to present the media asset;

the determining whether to automatically play the media asset includes identifying the media asset stored on the receiving device via the Service ID; and the receiving the indication of the condition for contacting the user of the receiving device being satisfied includes receiving an indication regarding a television broadcast signal loss to the receiving device.

12. A media asset presentation system, comprising:

at least one processor; and at least one memory coupled to the at least one processor, wherein the at least one memory has computer-executable instructions stored thereon that, when executed by the at least one processor, cause the at least one processor to perform operations comprising:

receiving, by one or more processors, an indication of a condition for contacting a user of a receiving device being satisfied;

in response to the receiving of the indication of the condition for contacting the user of the receiving device being satisfied, determining, by one or more processors, whether to automatically play, as or in conjunction with a customer service message to the user, a media asset stored on the receiving device, wherein the determining whether to automatically play the media asset stored on the receiving device is based on metadata stored on the receiving device associating the condition for contacting the user with the media asset stored on the receiving device, and wherein the metadata stored on the receiving device associating the condition for contacting the user with the media asset stored on the receiving device includes a service identifier (Service ID) associated with the condition for contacting the user and the media asset; and automatically playing, by one or more processors, the media asset as or in conjunction with a customer service message to the user based on the determination;

wherein:

the receiving device comprises a television receiver;

the condition comprises a condition indicating a problem with the television receiver or service to the television receiver;

the media asset comprises the customer service message to the user such that the media asset provides guidance on how to resolve the problem with the television receiver or service to the television receiver;

the service ID indicates a channel of the television receiver on which to present the media asset;

the determining whether to automatically play the media asset includes identifying the media asset stored on the receiving device via the Service ID; and the receiving the indication of the condition for contacting the user of the receiving device being satisfied includes receiving an indication regarding a television broadcast signal loss to the receiving device.

13. The system of claim 12 wherein the condition for contacting the receiving device is regarding: a delinquent account of a user for data or content service associated with the receiving device, a status of an account of the user for data or content service associated with the receiving device; a status of the receiving device or an account of the user for cable or satellite broadcast television service associated with the receiving device that indicates the receiving device is not connected via the Internet for additional services; whether one or more of: a maximum frequency threshold of playing the media asset stored on the receiving device has been reached and the media asset stored on the receiving device has been played a maximum total number of times; or selection of a recorded program stored on the receiving device for playing from a beginning of the recorded program.

* * * * *